US010037100B2

(12) United States Patent
Nayyar et al.

(10) Patent No.: US 10,037,100 B2
(45) Date of Patent: Jul. 31, 2018

(54) SNR-AWARE ACTIVE MODE TOUCH SCANS WITH ELECTRODE REALLOCATION

(71) Applicant: Apple Inc., Cupertino, CA (US)

(72) Inventors: Amit Nayyar, San Jose, CA (US); Shahrooz Shahparnia, Monte Sereno, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/745,344

(22) Filed: Jun. 19, 2015

(65) Prior Publication Data

US 2016/0259467 A1  Sep. 8, 2016

Related U.S. Application Data

(60) Provisional application No. 62/127,254, filed on Mar. 2, 2015.

(51) Int. Cl.
*G06F 3/041* (2006.01)
*G06F 1/32* (2006.01)

(52) U.S. Cl.
CPC .......... *G06F 3/0416* (2013.01); *G06F 1/3262* (2013.01)

(58) Field of Classification Search
CPC ...... G06F 1/3262; G06F 3/041; G06F 3/0416; G06F 3/044; G06F 3/0412; G06F 2203/04104
See application file for complete search history.

(56) References Cited

U.S. PATENT DOCUMENTS 5,483,261 A   1/1996  Yasutake
5,488,204 A   1/1996  Mead et al.
(Continued)

FOREIGN PATENT DOCUMENTS

JP   2000-163031 A   6/2000
JP   2002-342033 A   11/2002

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
(Continued)

*Primary Examiner* — Keith Crawley
(74) *Attorney, Agent, or Firm* — Morrison & Foerster LLP

(57) ABSTRACT

A touch controller can dynamically balance performance criteria, such as signal-to-noise ratio (SNR) thresholds, with power consumption for touch sensitive devices. A touch controller can be configured to reduce power consumption by reconfiguring bank boundaries for an active mode scan so as to reduce the number of banks scanned with a banked active mode scan. Additionally or alternatively, the stimulation signal amplitude and integration time of the touch controller can be dynamically adjusted to balance performance criteria with power consumption. Default integration times and default stimulation signal amplitudes can be increased in higher-noise operating environments to raise SNR, and can be reduced to save power in lower-noise operating environments. Additionally or alternatively, the touch scanning rate of the touch controller can be dynamically adjusted to reduce power consumption of the touch sensitive device or to reallocate touch sensing frames to increase integration times and thereby SNR performance.

22 Claims, 18 Drawing Sheets

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,237,667 B2 | 8/2012 | Krah | |
| 8,395,599 B2 | 3/2013 | Souchkov | |
| 8,479,122 B2 | 7/2013 | Hotelling et al. | |
| 8,970,506 B2 | 3/2015 | Krah et al. | |
| 8,988,384 B2 | 3/2015 | Krah et al. | |
| 2006/0197753 A1 | 9/2006 | Hotelling | |
| 2007/0229468 A1* | 10/2007 | Peng | G06F 3/044 345/173 |
| 2008/0024455 A1* | 1/2008 | Lee | G06F 3/044 345/173 |
| 2008/0158167 A1* | 7/2008 | Hotelling | G06F 3/0416 345/173 |
| 2010/0149110 A1* | 6/2010 | Gray | G06F 3/0416 345/173 |
| 2010/0200310 A1* | 8/2010 | Yeh | G06F 3/044 178/18.03 |
| 2011/0025629 A1* | 2/2011 | Grivna | G06F 3/0416 345/173 |
| 2012/0050216 A1* | 3/2012 | Kremin | G06F 3/044 345/174 |
| 2012/0154324 A1* | 6/2012 | Wright | G06F 3/0416 345/174 |
| 2012/0261199 A1* | 10/2012 | Kuo | G06F 3/0416 178/18.06 |
| 2013/0021294 A1* | 1/2013 | Maharyta | G06F 3/044 345/174 |
| 2013/0050116 A1* | 2/2013 | Shin | G06F 3/044 345/173 |
| 2013/0100071 A1* | 4/2013 | Wright | G06F 1/3262 345/174 |
| 2013/0194229 A1 | 8/2013 | Sabo et al. | |
| 2013/0215049 A1* | 8/2013 | Lee | G06F 3/0416 345/173 |
| 2014/0022203 A1 | 1/2014 | Karpin et al. | |
| 2014/0057681 A1 | 2/2014 | Grivas et al. | |
| 2015/0109217 A1* | 4/2015 | Zhu | G06F 1/3262 345/173 |
| 2015/0261340 A1 | 9/2015 | Krah | |
| 2016/0018921 A1 | 1/2016 | Matlick et al. | |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

| TOUCH SCAN | TOUCH SCAN | TOUCH SCAN | TOUCH SCAN | TOUCH SCAN | TOUCH SCAN | TOUCH SCAN |

*FIG. 9A*

| TOUCH SCAN | NO SCAN | TOUCH SCAN | NO SCAN | TOUCH SCAN | NO SCAN | TOUCH SCAN |

*FIG. 9B*

| TOUCH SCAN WITH INCREASED INTEGRATION TIME | TOUCH SCAN WITH INCREASED INTEGRATION TIME | TOUCH SCAN WITH INCREASED INTEGRATION TIME |

*FIG. 9C*

SNR-AWARE ACTIVE MODE TOUCH SCANS WITH ELECTRODE REALLOCATION

CROSS-REFERENCE TO RELATED APPLICATIONS

This application is a non-provisional application of U.S. Provisional Patent Application No. 62/127,254, filed Mar. 2, 2015, of which is hereby incorporated by reference in its entirety.

FIELD OF THE DISCLOSURE

This relates generally to touch-sensitive devices, and more particularly, to optimizing active mode touch scans for low-power, high-resolution operation.

BACKGROUND OF THE DISCLOSURE

Many types of input devices are presently available for performing operations in a computing system, such as buttons or keys, mice, trackballs, trackpads, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface. Touch sensing systems designed with a static signal-to-noise (SNR) performance for touch sensing scans may unnecessarily consume power when operating in lower-noise environments, and may not have sufficient SNR performance when operating in higher-noise environments.

SUMMARY

This is related to dynamically balancing performance criteria (e.g., signal-to-noise ratio (SNR)) with power consumption for touch sensitive devices. A touch controller can be configured to perform banked common mode touch scans (e.g., for banks in which no touch event was detected in a previous scan of the bank) and banked active mode touch scans (e.g., for banks in which a touch event was detected in a previous scan of the bank). The touch controller can further reduce power consumption by reconfiguring bank boundaries for an active mode scan so as to reduce the number of banks scanned with a banked active mode scan.

Additionally or alternatively, the stimulation signal amplitude and integration time of the touch controller can be dynamically adjusted to balance performance criteria with power consumption. The touch controller can be designed to have default integration times and default stimulation signal amplitudes for a plurality of predetermined frequencies. In higher-noise operating environments, when the default SNR performance can be inadequate, the stimulation signal amplitude and/or integration time can be increased to improve SNR performance. In lower-noise operating environments, when SNR performance can be more than sufficient to meet an SNR threshold, the stimulation signal amplitude and/or integration time can be reduced to reduce power consumption.

Additionally or alternatively, the scanning rate (touch, stylus/pen, etc.) of the touch controller can be dynamically adjusted to reduce power consumption of the touch sensitive device (e.g., reducing the touch scanning rate can translate into fewer touch sensing scans and thereby power savings) or the reduced touch scanning rate can provide scan frames that can be reallocated to increase integration times for touch and/or stylus sensing scans. Increased integration times can increase SNR of the touch and/or stylus sensing scans, and can thereby improve performance of the touch sensing device to meet performance criteria (e.g., a minimum SNR for touch signals at each node of a touch sensor panel).

BRIEF DESCRIPTION OF THE DRAWINGS

FIG. 9A illustrates an example group of touch sensing frames according to examples of the disclosure.

FIG. 9B illustrates an example group of touch sensing frames corresponding to a reduced touch scanning rate according to examples of the disclosure.

FIG. 9C illustrates an example reallocation of touch sensing frames to increase SNR according to examples of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This is related to dynamically balancing performance criteria (e.g., signal-to-noise ratio (SNR)) with power consumption for touch sensitive devices. A touch controller can be configured to perform banked common mode touch scans (e.g., for banks in which no touch event was detected in a previous scan of the bank) and banked active mode touch scans (e.g., for banks in which a touch event was detected in a previous scan of the bank). The touch controller can further reduce power consumption by reconfiguring bank boundaries for an active mode scan so as to reduce the number of banks scanned with a banked active mode scan.

Additionally or alternatively, the stimulation signal amplitude and integration time of the touch controller can be dynamically adjusted to balance performance criteria with power consumption. The touch controller can be designed to have default integration times and default stimulation signal amplitudes for a plurality of predetermined frequencies. In higher-noise operating environments, when the default SNR performance can be inadequate, the stimulation signal amplitude and/or integration time can be increased to improve SNR performance. In lower-noise operating environments, when SNR performance can be more than sufficient to meet an SNR threshold, the stimulation signal amplitude and/or integration time can be reduced to reduce power consumption.

Additionally or alternatively, the scanning rate (touch, stylus/pen, etc.) of the touch controller can be dynamically adjusted to reduce power consumption of the touch sensitive device (e.g., reducing the touch scanning rate can translate into fewer touch sensing scans and thereby power savings) or the reduced touch scanning rate can provide scan frames that can be reallocated to increase integration times for touch and/or stylus sensing scans. Increased integration times can increase SNR of the touch and/or stylus sensing scans, and can thereby improve performance of the touch sensing device to meet performance criteria (e.g., a minimum SNR for touch signals at each node of a touch sensor panel).

Figure 1A:
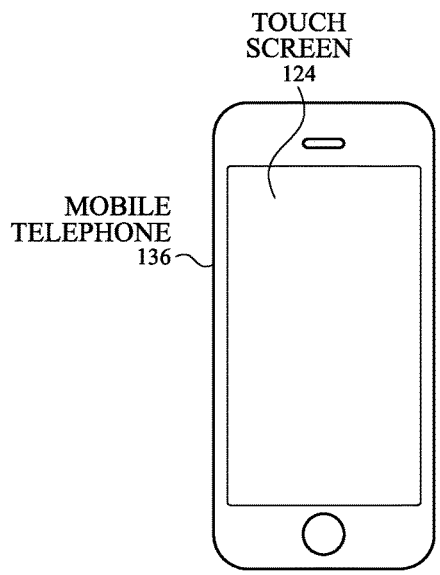
FIGS. 1A-1D illustrate example systems that can implement low-power, high resolution active mode scans according to examples of the disclosure.
Figure 1B:
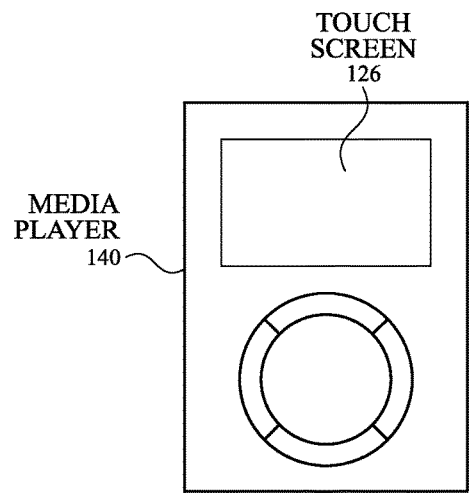
Figure 1C:
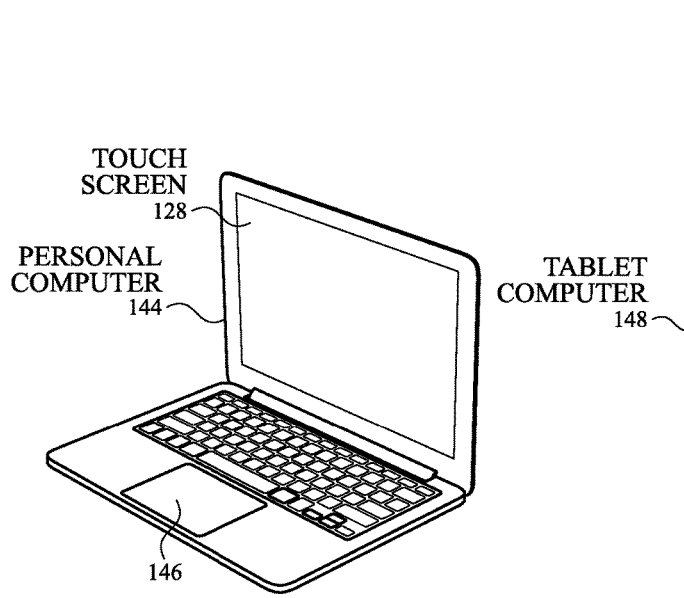
Figure 1D:
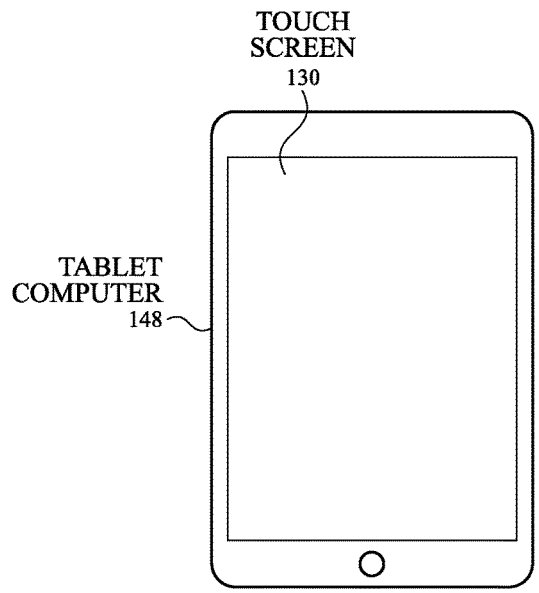

FIGS. 1A-1D illustrate example systems that can implement low-power, high resolution active mode scans according to examples of the disclosure. FIG. 1A illustrates an example mobile telephone 136 that includes a touch screen 124 and other computing system blocks that can implement low-power, high resolution active mode scans according to examples of the disclosure. FIG. 1B illustrates an example digital media player 140 that includes a touch screen 126 and other computing system blocks that can implement low-power, high resolution active mode scans according to examples of the disclosure. FIG. 1C illustrates an example personal computer 144 that includes a touch screen 128 and other computing system blocks that can implement low-power, high resolution active mode scans according to examples of the disclosure. FIG. 1D illustrates an example tablet computing device 148 that includes a touch screen 130 and other computing system blocks that can implement low-power, high resolution active mode scans according to examples of the disclosure. The touch screen and computing system blocks that can implement low-power, high resolution active mode scans can be implemented in other devices including wearable devices. Additionally, low-power, high resolution active mode scans can be implemented for other touch interfaces without a display, such as for trackpad 146 in FIG. 1C.

Touch screens 124, 126, 128 and 130 can be based on, for example, self-capacitance or mutual capacitance sensing technology, or another touch sensing technology. For example, in a self-capacitance based touch system, an individual electrode with a self-capacitance to ground can be used to form a touch pixel (touch node) for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of multiple objects when they touch the touch screen. A mutual capacitance based touch system can include, for example, drive regions and sense regions, such as drive lines and sense lines. For example, drive lines can be formed in rows while sense lines can be formed in columns (i.e., orthogonal). Touch pixels (touch nodes) can be formed at the intersections or adjacencies (in single layer configurations) of the rows and columns. During operation, the rows can be stimulated with an AC waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some examples, a touch screen can be multi-touch, single touch, projection scan, full-imaging multi-touch, or any capacitive touch.

Figure 2:
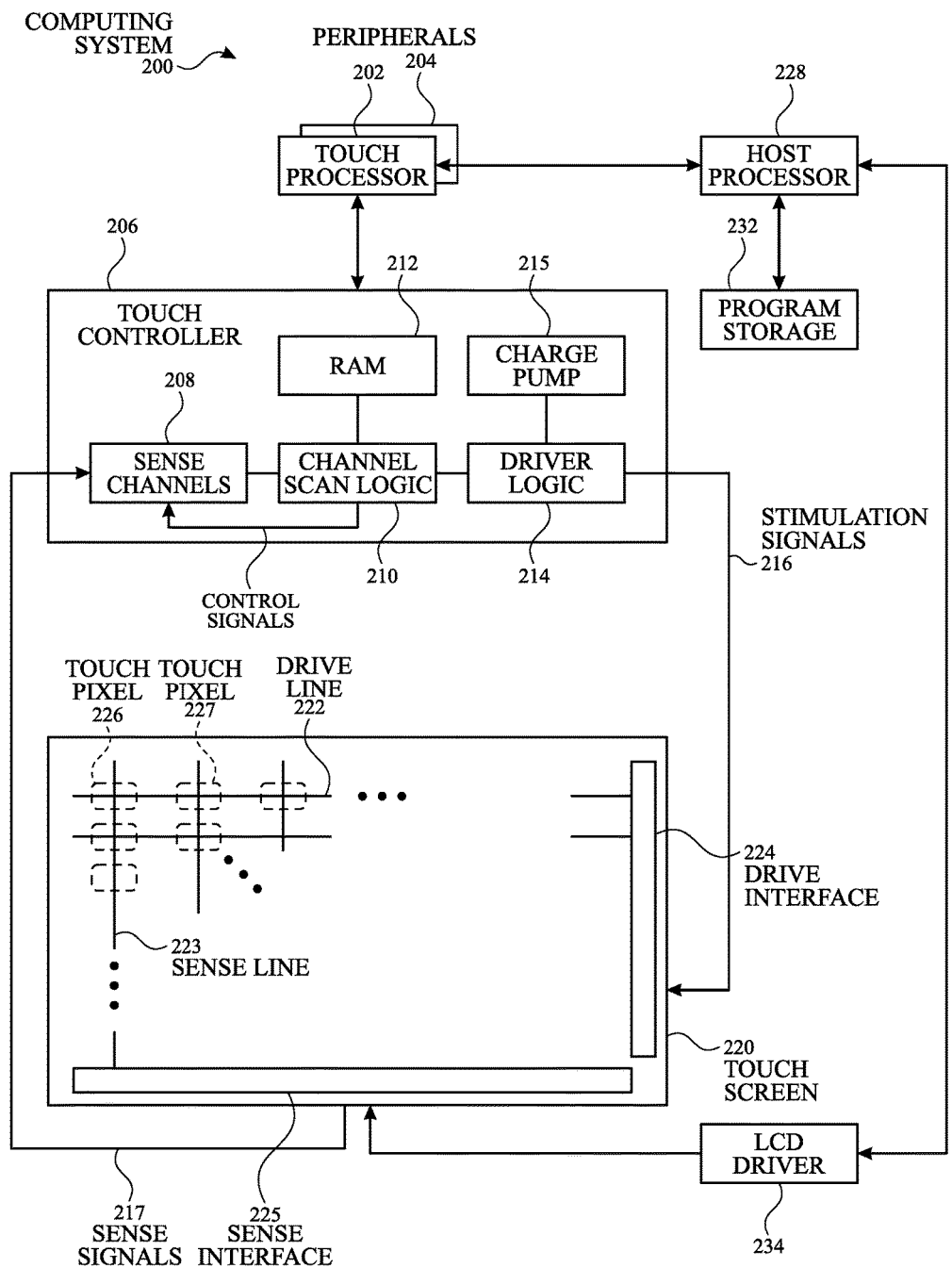
FIG. 2 illustrates an example computing system capable of implementing low-power, high resolution active mode scans according to examples of the disclosure.

FIG. 2 illustrates an example computing system capable of implementing low-power, high resolution active mode scans according to examples of the disclosure. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC).

It should be apparent that the architecture shown in FIG. 2 is only one example architecture of computing system 200, and that the system could have more or fewer components than shown, or a different configuration of components. The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller, such as a Liquid-Crystal Display (LCD) driver 234. It is understood that although the examples of the disclosure are described with reference to LCD displays, the scope of the disclosure is not so limited and can extend to other types of displays, such as Light-Emitting Diode (LED) displays, including Active-Matrix Organic LED (AMO-LED) and Passive-Matrix Organic LED (PMOLED) displays.

Host processor 228 can use LCD driver 234 to generate an image on touch screen 220, such as an image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

In some examples, RAM 212, program storage 232, or both, can be non-transitory computer readable storage media. One or both of RAM 212 and program storage 232 can have stored therein instructions, which when executed by touch processor 202 or host processor 228 or both, can cause the device including computing system 200 to perform one or more functions and methods of one or more examples of this disclosure.

Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 (also referred to as an event detection and demodulation circuit) in touch controller 206. In this way, drive lines and sense lines can be part of the touch sensing circuitry that can interact to form capacitive sensing nodes, which can be thought of as touch picture elements (touch pixels), such as touch pixels 226 and 227. This way of understanding can be particularly useful when touch screen 220 is viewed as capturing an "image" of touch. In other words, after touch controller 206 has determined whether a touch has been detected at each touch pixel in the touch screen, the pattern of touch pixels in the touch screen at which a touch occurred can be thought of as an "image" of touch (e.g., a pattern of fingers touching the touch screen). Although not shown in the example of FIG. 2, touch screen 220 can alternatively include self-capacitance touch sensing circuitry including an array of self-capacitance electrodes, as described above.

Figure 3:
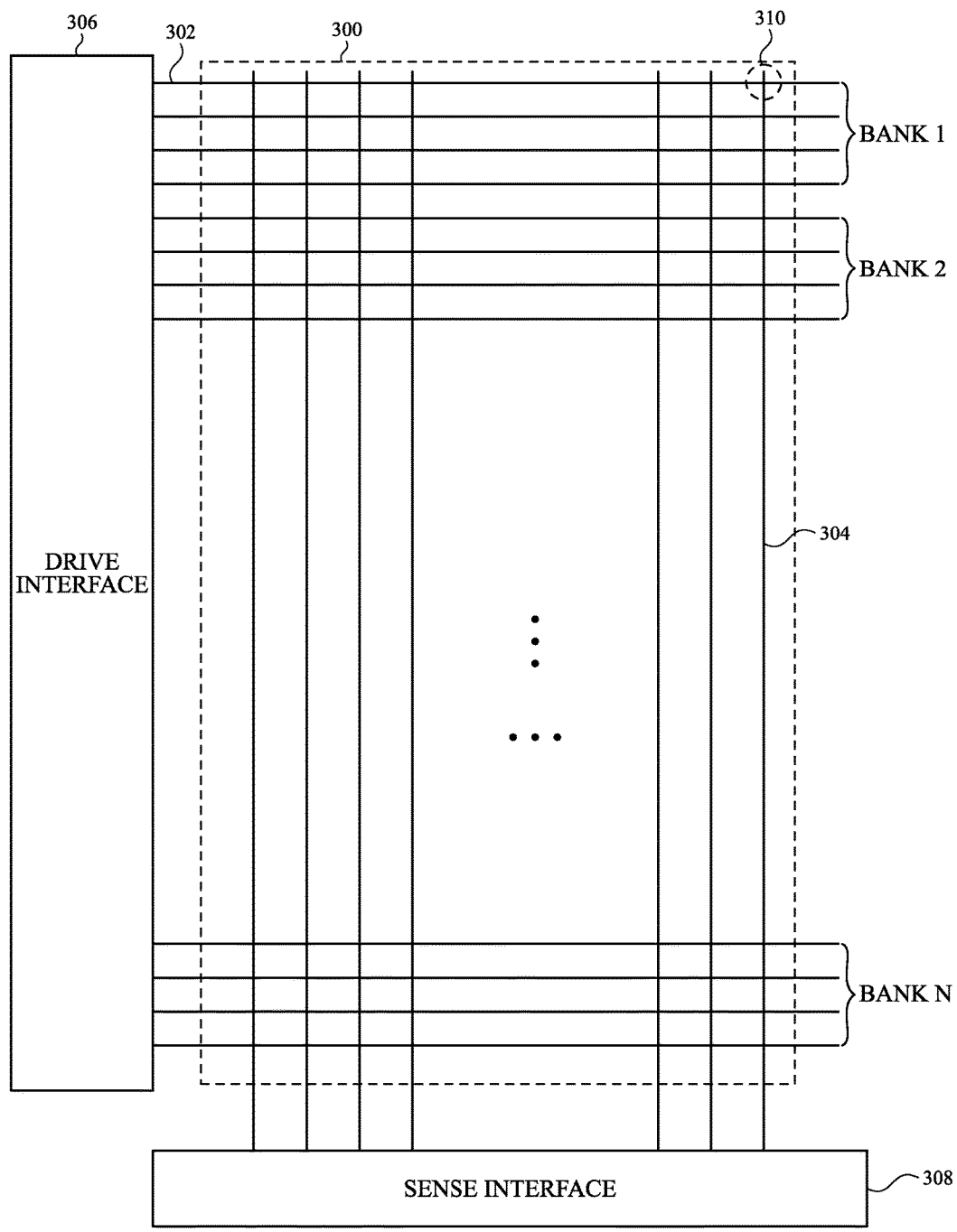
FIG. 3 illustrates an example touch sensor panel according to examples of the disclosure.

FIG. 3 illustrates an example touch sensor panel according to examples of the disclosure. Touch sensor panel 300, an example touch interface, can include a plurality of drive lines 302 and a plurality of sense lines 304 forming a plurality of touch nodes 310. Drive lines 302 (arranged in rows in this example) can be driven by stimulation signals received through drive interface 306, and resulting sense signals generated in sense lines 304 (arranged in columns in this example) can be transmitted through sense interface 308 to sense channels in the touch controller. A full panel touch sensor scan can be performed in order to determine whether a touch has been detected at each touch node 310 in the touch sensor panel 300 and/or an amount of touch detected at each touch node 310 in the touch sensor panel 300 (information that can be used to generate an image of touch). In single-stimulation examples, each drive line 302 of the touch sensor panel 300 can be stimulated independently (e.g., time multiplexed) and the sense signals generated in sense lines 304 in response to stimulation of a given row can be used to determine the presence and/or amount of touch for each touch node in the given row. In multi-stimulation (multi-stim) examples, a plurality of drive lines 302 can be stimulated simultaneous with different stimulation signals for a plurality of stimulation steps and the sense signals generated in sense lines 304 in response to the plurality of stimulation steps can be processed to determine the presence and/or amount of touch for each touch node in the touch sensor panel (corresponding to the plurality of drive lines). A more detailed discussion of multi-stimulation touch sensing can be found in U.S. Pat. No. 7,812,827 entitled "Simultaneous Sensing Arrangement" by Steve Hotelling, et al. (filed 3 Jan. 2007) and incorporated by reference herein. Although drive lines and sense line are discussed above, the touch sensor panel can include electrodes of the have different configurations and geometries.

In some examples, the drive lines 302 can be divided into banks and the full panel touch sensor scan can be performed by stimulating and sensing each bank independently using multi-stim techniques. Referring to FIG. 3, the touch sensor panel 300 can be divided into N banks comprised of four drive lines 302 each. Although FIG. 3 illustrates banks including four drive lines 302, it is understood that the banks can include a different number of drive lines 302. The multi-stim touch sensing scan of a bank with four drive lines can include simultaneously stimulating each drive line during each of four stimulation steps, for example, although in other examples a different number of stimulation steps can be used for a multi-stim scan of the bank. The phase of the stimulation signal applied to each drive line during each of the four stimulation steps can be selected (e.g., positive-phase/in-phase/0° or negative-phase/out-of-phase/180°) such that the sensed results can be processed to identify the capacitance for each node of the touch sensor panel corresponding to the bank. The set of phases to apply during a multi-stim touch sensing scan of a bank can be stored in memory, for example, and the same set of phases can be applied during the multi-stim touch sensing scan of another bank of the same size. Applying the multi-stim touch sensing techniques at a bank-level can simplify the scanning functionality of the touch controller. In other examples, drive lines of a bank can be stimulated using single stimulation techniques.

Additionally, although FIG. 3 illustrates a mutual capacitance touch sensor panel configuration, in other examples in the disclosure the touch sensor panel can be configured to perform self-capacitance scans of the touch sensor panel.

In addition to performing a full panel touch sensor scan, the example touch sensor panel can also be configured to perform a banked common mode scan of the touch sensor panel. During a banked common mode scan of the touch sensor panel, a bank of drive lines 302 can be simultaneously stimulated with a common stimulation signal, and the sense signals generated in one or more sense lines 304 in response to stimulation of the bank can be used to determine the presence and/or amount of touch at the region corresponding to the bank. Performing a common mode scan for multiple banks of the touch sensor panel can provide coarse information about the presence or absence of a touch at one or more banks. As a result, a common mode scan can also sometimes be referred to as a coarse scan. In some examples, stimulation of each bank of the touch sensor panel can be time-multiplexed (single stimulation), though in other examples, the common mode stimulation of banks can be frequency-multiplexed or performed using bank-level multi-stim techniques. Performing a banked common mode scan rather a common mode scan of all drive lines 302 of the touch sensor panel (i.e., stimulating all drive lines simultaneously with a common mode voltage) can ensure proper sensitivity and SNR properties for the sense channels. As the number of drive lines per sense channel increases, the large signal from common mode stimulation can reduce the sensitivity and signal-to-noise ratio properties of the sense channel.

Touch sensing scans can be arranged to take place during designated touch sensing frames. In some examples requiring continuous touch information, full panel touch sensor scanning can be repeated during each touch sensing frame in order to detect touch and/or hover events at the touch sensor panel. Continuous touch full panel touch sensor scanning can be advantageous in that it can provide complete touch information for each scanning frame and can allow the system to be immediately responsive to touches. Performing a full panel touch sensing scan during each touch sensing frame, however, can consume power even though during some of the touch sensing frames no touch and/or hover event occurs.

In some examples, rather than performing full panel touch sensor scanning during each touch frame, the system can dynamically alter the operation for the upcoming frame based on a banked common mode detection scan for a current frame. For example, when no touch is detected during the previous scan of the touch sensor panel, the touch sensing system can perform a banked common mode detection scan of each bank to detect one or more touch events at the touch sensor panel. When a touch is detected during the previous scan of the touch sensor panel, the touch sensing system can perform a targeted active mode scan (e.g., using banked multi-stim scanning techniques) of banks at which touch events were detected, and a common mode detection scan of the remaining banks. Performing a common mode detection scan of banks where no touch was previously detected rather than an active mode scan can save power because the common mode detection scan of a bank consumes less power than an active mode scan of the bank. In fact, a common mode scan of all banks in the touch sensor panel can consume at least four times less power than an active mode scan of all banks of the touch sensor panel (assuming a bank size of four drive lines).

Figure 4A:
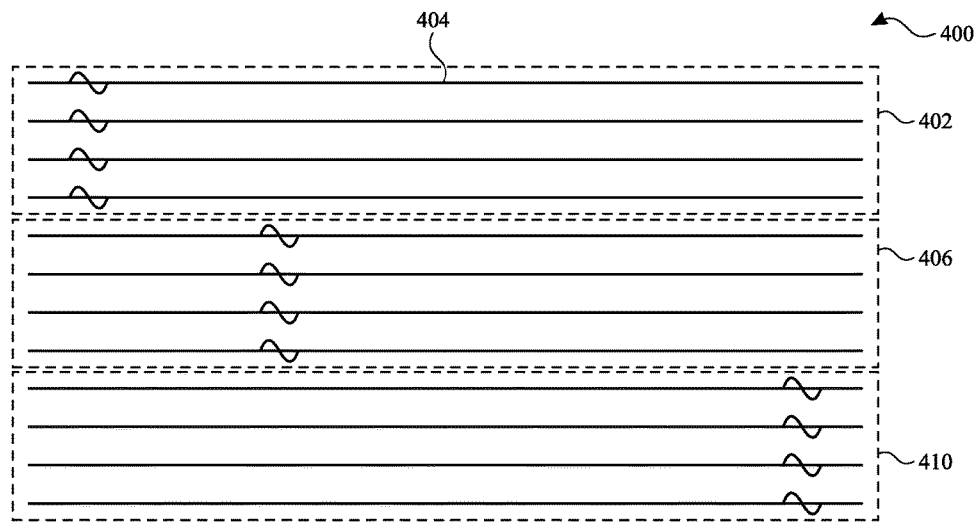
FIG. 4A illustrates an example banked common mode scan of a touch sensor panel according to examples of the disclosure.

FIG. 4A illustrates an example banked common mode scan of a touch sensor panel according to examples of the disclosure. FIG. 4A illustrates a touch sensor panel 400 including twelve drive lines, such as drive line 404, allocated to three banks. In the example illustrated in FIG. 4A, each of banks 402, 406 and 410 is allocated four drive lines. For simplicity, FIG. 4A omits the sense lines of the touch sensor panel. Additionally, although FIG. 4A only shows twelve drive lines allocated to three banks, a touch sensor panel can include a different number of drive lines allocated to a different number of banks. During a banked common mode scan of touch sensor panel 400, each of banks 402, 406 and 410 can be stimulated with common mode stimulation signals to generate coarse location information about the presence or absence of a touch in each bank. During a first step of the banked common mode scan of the touch sensor panel 400, a common mode stimulation signal can be simultaneously applied to each drive line 404 in bank 402, as illustrated by the common mode signal waveforms on the drive lines allocated to bank 402. The signals received by the sense lines (not shown) in response to the common mode stimulation signal in the first step can be processed to determine coarse touch information for bank 402. During a second step of the banked common mode scan of the touch sensor panel 400, a common mode stimulation signal can be simultaneously applied to each drive line in bank 406, as illustrated by the common mode signal waveforms on the drive lines allocated to bank 406. Similarly, during a third step of the banked common mode scan of the touch sensor panel 400, a common mode stimulation signal can be simultaneously applied to each drive line in bank 410, as illustrated by the common mode signal waveforms on the drive lines allocated to bank 410. The signals received by the sense lines (not shown) in response to the common mode stimulation signals in the second and third steps, respectively, can be processed to determine coarse touch information for banks 406 and 410. The order of scanning banks of the touch sensor panel can follow the order described above or a different order so as to scan each bank in the touch sensor panel to generate coarse touch information for the touch sensor panel.

Figure 4B:
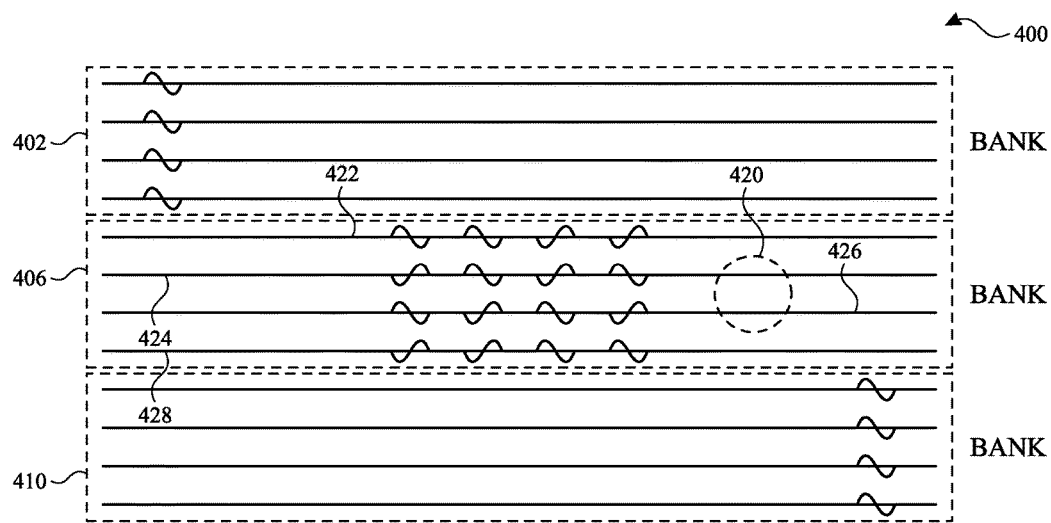
FIG. 4B illustrates an example touch sensing scan of the touch sensor panel when a touch event has been detected at a bank according to examples of the disclosure.

A banked common mode scan of the entire touch sensor panel can occur when no touch events have been detected on the touch sensor panel during the previous touch sensing scan. FIG. 4B illustrates an example touch sensing scan of the touch sensor panel when a touch event has been detected at a bank according to examples of the disclosure. As illustrated in FIG. 4B, a touch event 420 can be detected from a previous touch sensing scan at bank 406. During the current touch sensing scan of the touch sensor panel 400 illustrated in FIG. 4B, a banked multi-stim active mode scan (i.e., fine scan) can be used to detect fine touch location information for bank 406. The remaining banks (i.e., bank 402 and bank 410) can be stimulated during the current touch sensing scan of the touch sensor panel 400 with a banked common mode scan. As discussed above, the order of the active mode scan and the banked common mode scan can be varied. However, as illustrated in the example of FIG. 4B, during a first step, each drive line in bank 402 can be stimulated with a common mode stimulation signal, and the sensed signals can be processed to generate coarse touch information for bank 402. During the second step, an active mode scan can be performed as illustrated by the plurality of multi-stim signals at bank 406. During each step of the active mode scan of bank 406, the drive lines of bank 406 can be stimulated with a group of stimulation signals. For example, the stimulation waveforms can have a common frequency but different phases depending on the multi-stim step. As illustrated in FIG. 4B for example, during the first step of the active mode scan, the signals simultaneously applied to drive lines 422, 424, 426 and 428 can include in-phase stimulation signals applied to drive line 422 and drive line 426, and can include out-of-phase stimulation signals applied to drive line 424 and drive line 428. During each step of the multi-stim active mode scan, the phase of the drive signal simultaneously applied to each drive line can be changed. The sensed signals from each step of the multi-stim active mode scan can be processed to generate fine touch information, including touch information for each node of the touch sensor panel 400 corresponding to bank 406, for example. During the third step, each drive line in bank 410 can be simultaneously stimulated with a common mode stimulation signal, and the sensed signals can be processed to generate coarse touch information for bank 410.

Although discussed above as performing one touch sensing scan per bank per touch sensing frame, in some examples, the touch controller can perform a banked common mode scan for each bank of the touch sensor panel, and then perform a targeted active mode scan during the same frame for each bank at which a touch event was coarsely detected.

In the example illustrated in FIG. 4B, touch event 420 can be detected by scanning only bank 406. In other examples, a touch event can be detected that spans two or more adjacent banks, even though fewer than all electrodes/drive lines in the two or more banks need to be stimulated to generate fine touch information for the touch sensor panel. In some examples, the touch controller can reconfigure the bank boundaries and reallocate drive lines to form a new bank, so as to reduce the number of banks stimulated with an active mode scan. As a result, in those instances, stimulating fewer banks with active mode scans can reduce power consumption while maintaining the touch performance of the touch sensitive device.

Figure 4C:
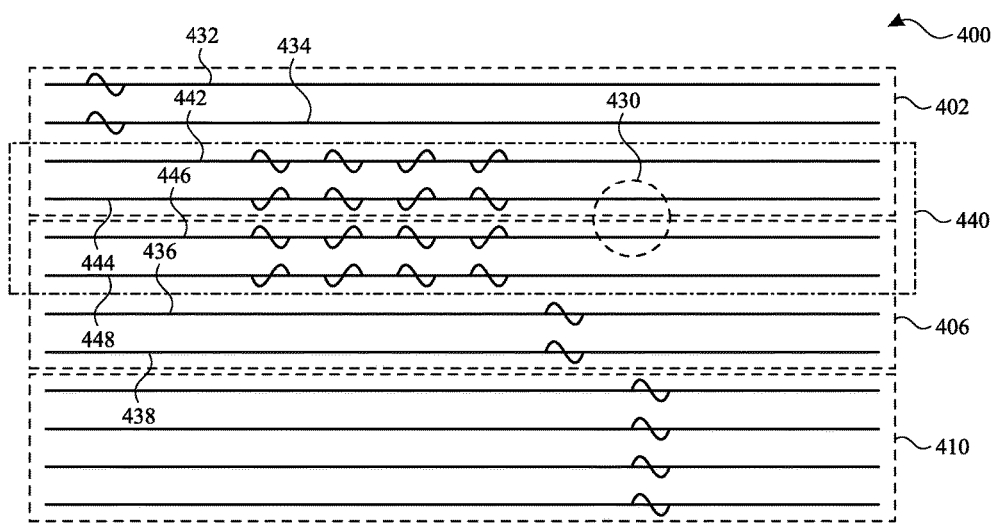
FIG. 4C illustrates an example of reconfigured multi-stim bank boundaries when a touch event has been detected between two adjacent banks according to examples of the disclosure.

FIG. 4C illustrates an example of reconfigured multi-stim bank boundaries when a touch event has been detected between two adjacent banks according to examples of the disclosure. As illustrated in FIG. 4C, a touch event 430 can be detected from a previous touch sensing scan at a location overlapping bank 402 and bank 406. During the current touch sensing scan of the touch sensor panel 400 illustrated in FIG. 4C, rather than performing an active mode scan to detect touch at each of banks 402 and 406, one or more drive lines from each of banks 402 and 406 can be allocated to a new bank 440. An active mode scan of bank 440 can be used to detect fine touch location information for bank 440, reducing the number of banks scanned with a multi-stim active mode scan and thereby saving power. The remaining lines and/or banks can be stimulated during the current touch sensing scan of the touch sensor panel 400 with banked common mode scans. As discussed above, the order of the active mode scans and the banked common mode scans can be varied. However, as illustrated in the example of FIG. 4C, during a first step, the drive lines from bank 402 that are not allocated to bank 440 (i.e., drive lines 432 and 434) can be stimulated with a common mode stimulation signal, and the sensed signals can be processed to generate coarse touch information for the drive lines of bank 402 that are not allocated to bank 440. During the second step, an active mode scan can be performed at bank 440. For simplicity, the discussion of a multi-stim active mode scan is not repeated here. During a third step, the drive lines from bank 406 that are not allocated to bank 440 (i.e., drive lines 436 and 438) can be simultaneously stimulated with a common mode stimulation signal, and the sensed signals can be processed to generate coarse touch information for the drive lines of bank 406 that are not allocated to bank 440. During a fourth step, each drive line in bank 410 can be simultaneously stimulated with a common mode stimulation signal, and the sensed signals can be processed to generate coarse touch information for bank 410.

The allocation of drive lines from banks 402 and 406 to bank 440 can depend on the location of touch event 430. In the example of FIG. 4C, touch event 430 can be detected at a location corresponding to drive lines 444 (previously allocated to bank 402) and 446 (previously allocated to bank 406). Adjacent drive lines 442 (previously allocated to bank 402) and 448 (previously allocated to bank 406) can be allocated to bank 440 as well such that bank 440 has the same number of drive lines as a defined bank size for the device. In some cases, drive lines selected from the adjacent banks can depend on a centroid of the touch event 430. For example, the centroid of touch event 430 can be located between drive lines 444 and 446, and centering bank 440 around the centroid of touch event 430 can result in allocated an equal number of drive lines from each of banks 402 and 406. In other examples, the location and centroid of touch event 430 can result in including more drive lines from one bank than the other adjacent bank (e.g., three drive lines from bank 402 and one drive line from bank 406).

The drive lines of banks 402 and 406 that are not allocated to bank 440 can be considered sub-banks and scanned with a common mode scan for the sub-bank size. Alternatively, the unallocated drive lines of banks 402 and 406 can be scanned as one bank (with non-adjacent drive lines) during one common mode scan step. In other examples, the unallocated drive lines can be allocated to a neighboring bank that is scanned with banked common mode scans. For example, if the touch sensor panel of FIG. 4C includes another bank of four drive lines above bank 402 (not shown), then the unallocated drive lines of bank 402 can be allocated to the bank above bank 402 to form a bank having six drive lines that can be stimulated with a banked common mode scan. In some examples, the larger banks can be formed at the edges of the touch sensor panel (e.g., the banks performing common mode scans can be reconfigured as well, such that bank sizes change only at the edges of the panel), rather than forming the larger bank proximate to the non-allocated lines. For example, if the touch sensor panel of FIG. 4C includes two banks of four drive lines above bank 402 (not shown), then the unallocated drive lines of bank 402 can form a bank along with some drive lines of the bank above and adjacent to bank 402. The remaining drive lines of the bank above and adjacent to bank 402 can be combined with the drive lines of the bank above and not adjacent to bank 402 (the bank at the edge of the touch sensor panel) to form a larger bank of six drive lines, but at the edge of the touch sensor panel.

The example of FIG. 4C illustrates only one touch event 430, which can correspond to a single object (e.g., a finger or a stylus, etc.) touching or proximate to the touch sensor panel. When multiple objects are touching or proximate to the touch sensor panel, scanning only one bank of the touch sensor panel can be less likely to be sufficient, thus mitigating any potential power savings from reconfiguring bank boundaries. Instead the touch sensor panel can scan each bank in which some or all of a touch event occurred (or alternatively all banks of the touch sensor panel), rather than reconfiguring bank boundaries.

Figure 4D:
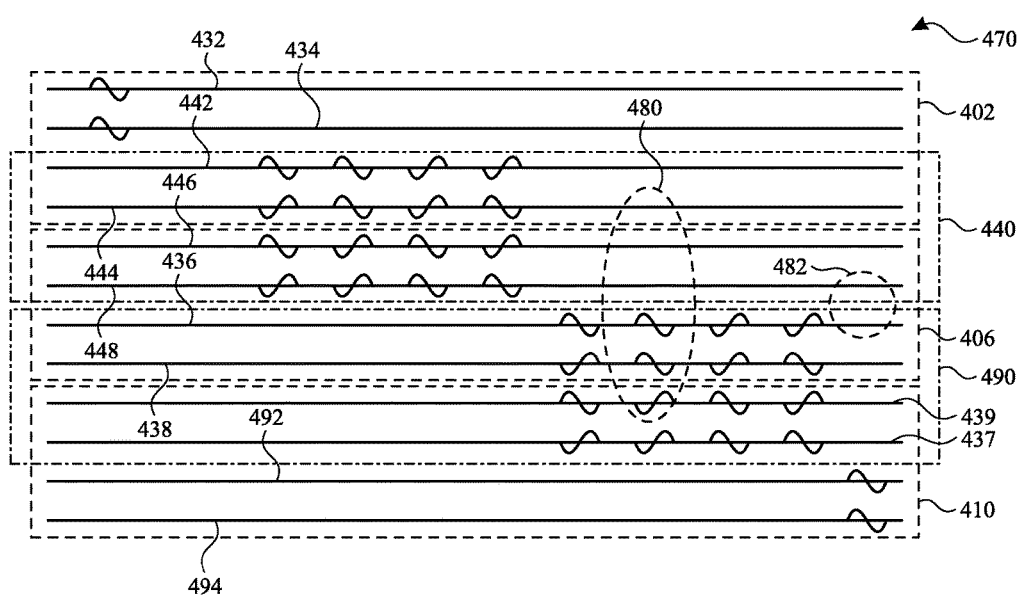
FIG. 4D illustrates an example of reconfigured multi-stim bank boundaries when one or more touch events have been detected between two or more adjacent banks according to examples of the disclosure.

In some examples, the number of adjacent banks can be greater than two (e.g., two or more). Additionally, in some examples, the touch events detected within the two or more adjacent banks can correspond to more than one object touching or proximate to the touch sensor panel (e.g., when the objects touching the panel fall within the banks that are scanned with active mode scans. FIG. 4D illustrates an example of reconfigured multi-stim bank boundaries when one or more touch events have been detected between two or more adjacent banks according to examples of the disclosure. As illustrated in FIG. 4D, one or more touch events, including touch event 480 and touch event 482 can be detected from a previous touch sensing scan. Touch event 480 can be detected at a location overlapping banks 402, 406 and 410. Touch event 482 can be detected at a location corresponding to bank 406 (and within the banks corresponding to touch event 480). During the current touch sensing scan of the touch sensor panel 470 illustrated in FIG. 4D, rather than performing an active mode scan to detect touch at each of banks 402, 406 and 410, one or more drive lines from each of banks 402, 406 and 410 can be allocated to a new banks 440 and 490. An active mode scan of bank 440 and an active mode scan of bank 490 can be used to detect fine touch location information for bank 440 and bank 490, reducing the number of banks scanned with a multi-stim active mode scan and thereby saving power. The remaining lines and/or banks can be stimulated during the current touch sensing scan of the touch sensor panel 470 with banked common mode scans. As discussed above, the order of the active mode scans and the banked common mode scans can be varied. However, as illustrated in the example of FIG. 4D, during a first step, the drive lines from bank 402 that are not allocated to bank 440 (i.e., drive lines 432 and 434) can be stimulated with a common mode stimulation signal, and the sensed signals can be processed to generate coarse touch information for the drive lines of bank 402 that are not allocated to bank 440. During the second step, an active mode scan can be performed at bank 440. During the third step, an active mode scan can be performed at bank 490. For simplicity, the discussion of a multi-stim active mode scan is not repeated here for banks 440 and 490. During a fourth step, the drive lines from bank 410 that are not allocated to bank 490 (i.e., drive lines 492 and 494) can be simultaneously stimulated with a common mode stimulation signal, and the sensed signals can be processed to generate coarse touch information for the drive lines of bank 406 that are not allocated to bank 440.

The allocation of drive lines from banks 402, 406 and 410 to banks 440 and 490 can depend on the location of touch events 480 and 482. In the example of FIG. 4D, touch event 482 can be detected at a location corresponding to drive lines 448 and 436 (previously allocated to bank 406). Similarly, touch event 480 can be detected at a location corresponding to drive lines 444 (previously allocated to bank 402), drive lines 446, 448, 436 and 438 (previously allocated to bank 406), and drive line 439 (previously allocated to bank 410). Adjacent drive lines 442 and 444 (previously allocated to bank 402) and 446 and 448 (previously allocated to bank 406) can be allocated to bank 440 such that bank 440 has the same number of drive lines as a defined bank size for the device. Adjacent drive lines 436 and 438 (previously allocated to bank 406) and 437 and 439 (previously allocated to bank 410) can be allocated to bank 490 such that bank 490 has the same number of drive lines as a defined bank size for the device. In some cases, drive lines selected from the adjacent banks can depend on a centroid of the touch events 480 and 482. For example, the centroid of touch events 480 and 482 can be located between drive lines 444 and 436, and centering banks 440 and 490 around the centroid of touch events 480 and 482 can result in allocated an equal number of drive lines from each of banks 402 and 410. In other examples, the location and centroid of touch events 480 and 482 can result in including more drive lines from one bank than the other adjacent bank (e.g., three drive lines from bank 402 and one drive line from bank 410).

The drive lines of banks 402 and 410 that are not allocated to banks 440 and 490 can be considered sub-banks and scanned with a common mode scan for the sub-bank size. Alternatively, the unallocated drive lines of banks 402 and 410 can be scanned as one bank (with non-adjacent drive lines) during one common mode scan step. In yet other examples the unallocated drive lines can be joined with banks performing common mode scans (e.g., adjacent banks or reconfigure bank boundaries performing common mode scans so as to have larger bank sizes at edges of the touch sensor panel).

The example of FIG. 4D illustrates three adjacent banks and two touch events which can correspond to two objects touching or proximate to the touch sensor panel. When multiple objects are touching or proximate to the touch sensor panel, but within an area that can be scanned by a number of adjacent banks (and a smaller number of banks than required to detect the touch events), reconfiguring bank boundaries can result in power savings from reducing the number of banks scanned. It should be understood that although two touch events were illustrated, the number of touch events within banks 440 and 490 can be greater than two. Additionally, it should be understood that although touch event 480 was detected in three adjacent banks, the number of adjacent banks can be greater than three. A limit on the number of adjacent banks can be determined experimentally so that power savings can be achieved by reconfiguring bank scans.

Figure 4E:
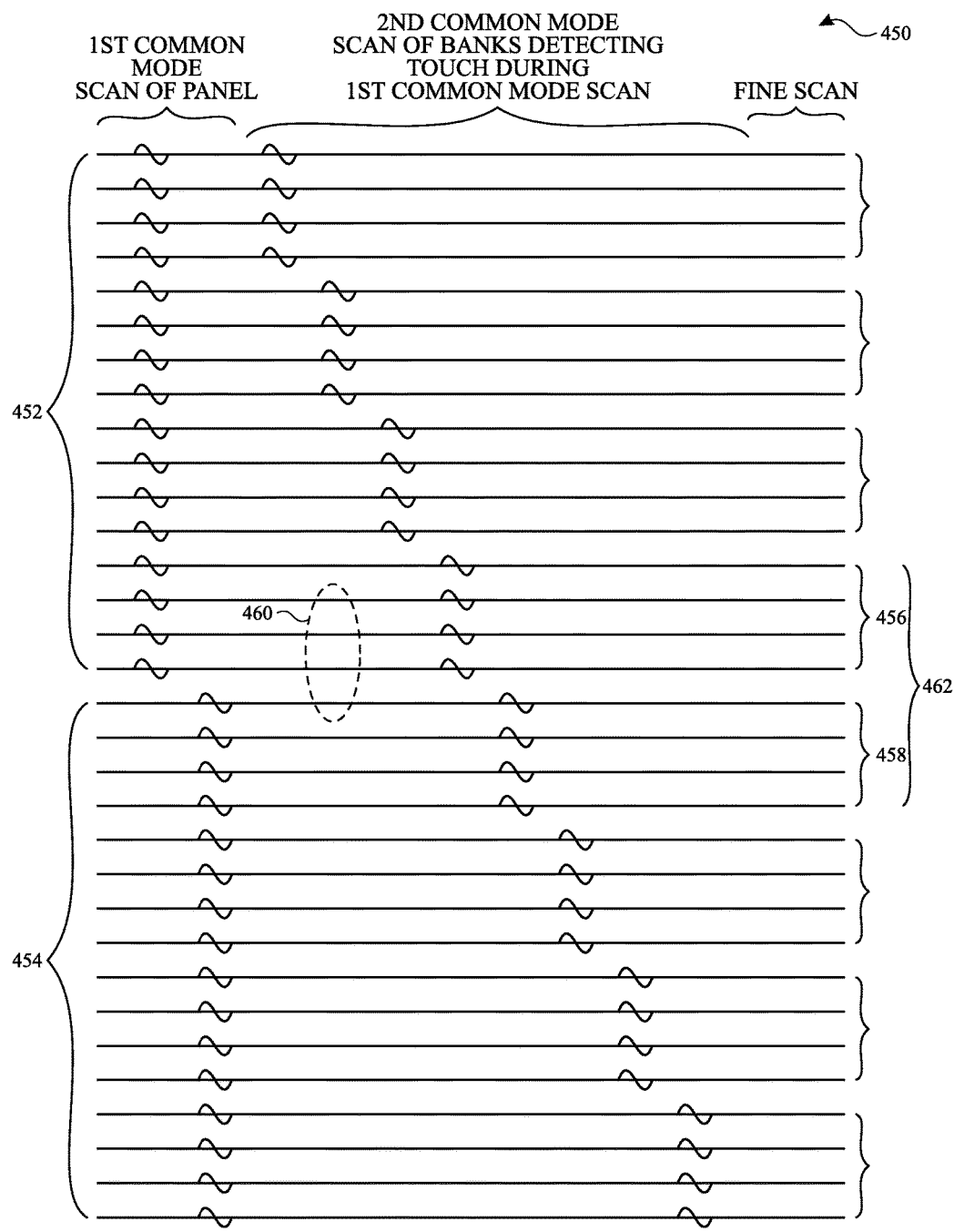
FIG. 4E illustrates an example of multiple banked common modes scans used for reconfiguring multi-stim bank boundaries according to examples of the disclosure.

In some examples, multiple banked common modes scans can be used to reconfigure bank boundaries for multi-stim active mode scans. FIG. 4E illustrates an example of multiple banked common modes scans used for reconfiguring multi-stim bank boundaries according to examples of the disclosure. FIG. 4E illustrates a touch sensor panel 450 including thirty-two drive lines, and for simplicity omits the sense lines of the touch sensor panel 450. The drive lines can be allocated to two banks, bank 452 and bank 454 (i.e., sixteen drive lines allocated to each bank). Although only thirty-two drive lines allocated to two banks are shown, a touch sensor panel can include a different number of drive lines allocated to a different number of banks. During a first banked common mode scan of touch sensor panel 450, each of banks 452 and 454 can be stimulated with common mode stimulation signals to generate coarse location information about the presence or absence of a touch at each bank. For example, in a first step, each drive line in bank 452 can be simultaneously stimulated with a common mode stimulation signal, and the sensed signals can be processed to generate coarse touch information for bank 452. In a second step, each drive line in bank 454 can be simultaneously stimulated with a common mode stimulation signal, and the sensed signals can be processed to generate coarse touch information for bank 454.

A touch event 460 that overlaps banks 452 and 454 can result in detecting a coarse touch location for the portion of the touch event at bank 452 and a second coarse touch location for the portion of the touch event at bank 454. A second banked common mode scan can be performed for smaller sized banks (sub-banks) within each bank that detected a coarse location of a touch event during the first banked common mode scan. For example, as illustrated in FIG. 4E, the bank size for the first common mode scan can be sixteen drive lines and the bank size for the second common mode scan can be four drive lines. In each step of the second banked common mode scan, smaller banks (sub-banks) of drive lines can be stimulated with a common mode stimulation signal. The banks stimulated during the second banked common mode scan can be considered sub-banks of the banks at which touch events were detected during the first banked common mode scan of the touch sensor panel. In the example of FIG. 4E, after stimulating the sub-banks of banks 452 and 454, touch event 460 can be coarsely detected (coarsely relative to the location provided by an active mode scan) at sub-banks 456 and 458. Although two banked common mode touch sensing scan are illustrated in FIG. 4E, a different number of common mode scans can be used.

A multi-stim active mode scan (fine scan) can follow the second banked common mode scan, though the stimulation steps of the active mode scan are not illustrated for simplicity. The active mode scan can be performed using a bank size of four drive lines by applying the multi-stim techniques described above to banks 456 and 458. Alternatively, bank 462, including eight drive lines, can be scanned using multi-stim techniques for a bank size of eight drive lines (e.g., an 8 step scan), although different bank sizes can be used. Depending on the bank size for the multi-stim active mode scan, the touch controller can be configured to generate and apply the appropriate number of stimulation signals with the appropriate phases to generate touch information for each node of the touch sensor panel corresponding with the bank. The remaining drive lines can be stimulated with common mode stimulation signals (allocated into banks of different sizes or not allocated into banks) to determine coarse touch location information for any banks not stimulated with banked active mode scans.

In other examples, rather than performing multiple banked common modes scans, the touch sensor panel can be configured to perform self-capacitance scans (e.g., self-capacitance ready mode scans) of the touch sensor panel to determine a coarse location of objects touching or proximate to the panel. The self-capacitance scans can include one or more scans of the rows of electrodes (e.g., single stimulation or multi-stimulation) and can include one or more scans of the columns of electrodes (e.g., single stimulation or multi-stimulation). During the self-capacitance scans the coupling between the drive lines 302 (row electrodes for self-capacitance scans) and sense lines 304 (column electrodes for self-capacitance scans) can be coupled to different drive and sense interfaces than shown in FIG. 3 for a mutual capacitance scan. For example, in the self-capacitance scans, each electrode can be coupled to drive and/or sense circuitry to measure self-capacitances on rows and/or columns. The information generated from self-capacitance scans can be used to determine which banks to stimulate using banked multi-stim active mode scans. Additionally, in other examples, information from one or more banked common scans and one or more self-capacitance scan can be used to determine information used to ascertain boundaries of the banks to scan with banked multi-stim active mode scans.

Figure 5A:
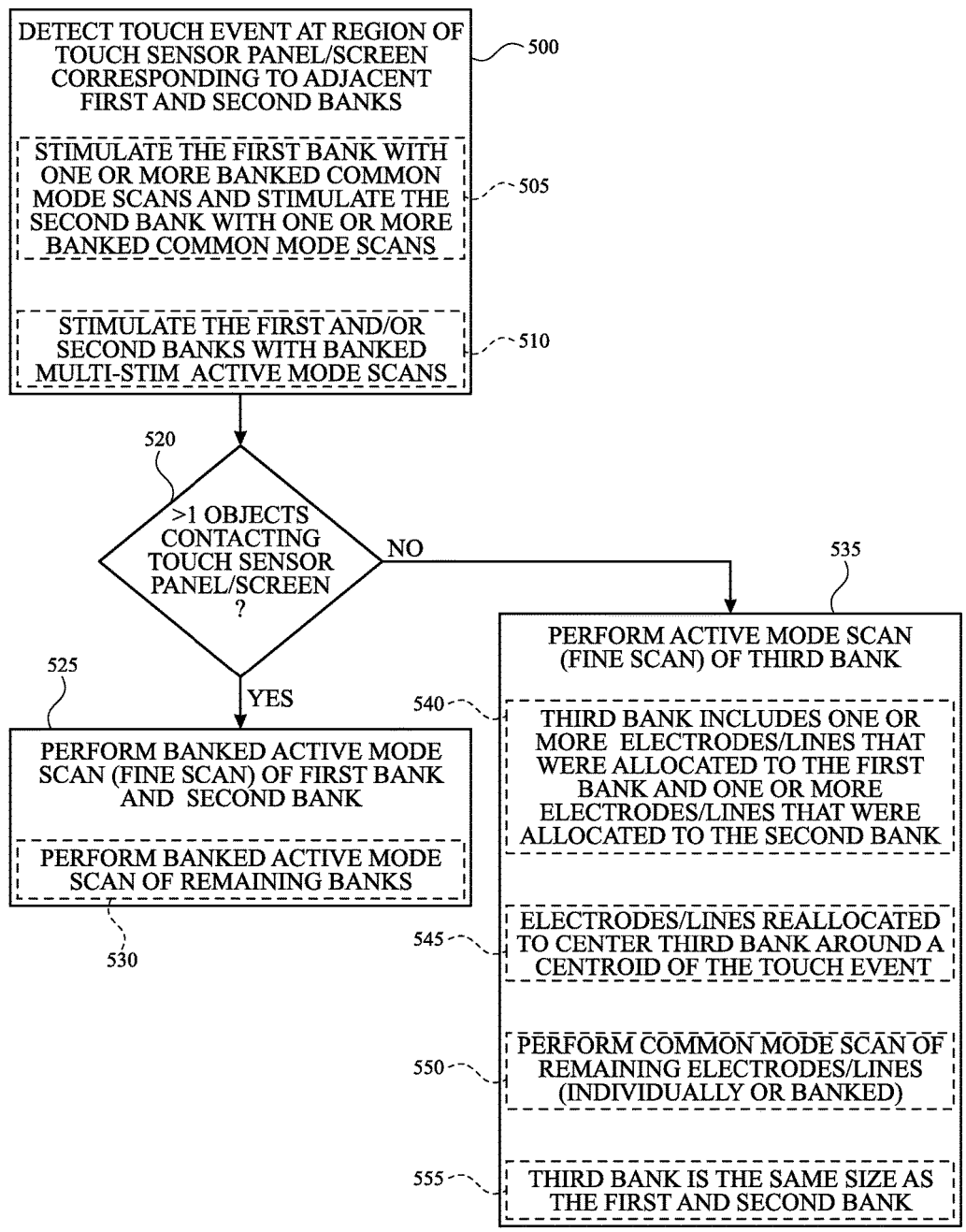
FIG. 5A illustrates an example process for performing touch sensing scanning operations according to examples of the disclosure.

FIG. 5A illustrates an example process for performing touch sensing scanning operations according to examples of the disclosure. The system can be configured to detect, during a first touch sensing period, a touch event at a region of a touch sensor panel (or touch screen) corresponding to adjacent first and second banks (i.e., a touch event that overlaps two adjacent banks) (500). In some examples, detecting the touch event can include stimulating the first bank with a first common mode stimulation signal to detect a first coarse location of the touch event within the region of the touch sensor panel corresponding to the first bank, and subsequently stimulating the second bank with a second common mode stimulation signal to detect a second coarse location of the touch event within the region of the touch sensor panel corresponding to the second bank (505). In other examples, detecting the touch event can include stimulating the first bank with an active mode scan to detect a first fine location of the touch event within the region of the touch sensor panel corresponding to the first bank and/or stimulating the second bank with a multi-stim active mode scan to detect a second fine location of the touch event within the region of the touch sensor panel corresponding to the second bank (510). Stimulating the first and second banks at 505 can correspond to a case where no touch events were detected in the previous touch sensing scan. Stimulating the first and/or second banks at 510 can correspond to a case where one or more touch events were detected in the previous touch sensing scan.

The system can determine the number of objects contacting the touch sensor panel, which can be used to determine the scanning operation during a second touch sensing period (520). When multiple objects (e.g., multiple fingers) are detected contacting the touch sensor panel, the system can perform, during the second touch sensing period, an active mode scan (i.e., fine scan) of the first bank and an active mode scan of the second bank (525). In addition, in some examples, the system can perform an active mode scan of any remaining banks of the touch sensor panel (530). When only one object (e.g., one finger or a stylus) is detected contacting the touch sensor panel, the system can perform, during the second touch sensing period, an active mode scan of a third bank (535). The third bank can include one or more drive lines that were allocated to the first bank during the first touch sensing period and one or more drive lines that were allocated to the second bank during the first touch sensing period (540). The electrodes selected to be reallocated to the third bank can be selected so as to center the third bank around a centroid of the touch event (545). The system can perform a common mode scan of each remaining line or bank during the second touch sensing period (550). The third bank can have the same bank size as the first bank and can have the same bank size as the second bank (i.e., the same number of drive lines) (555).

Figure 5B:
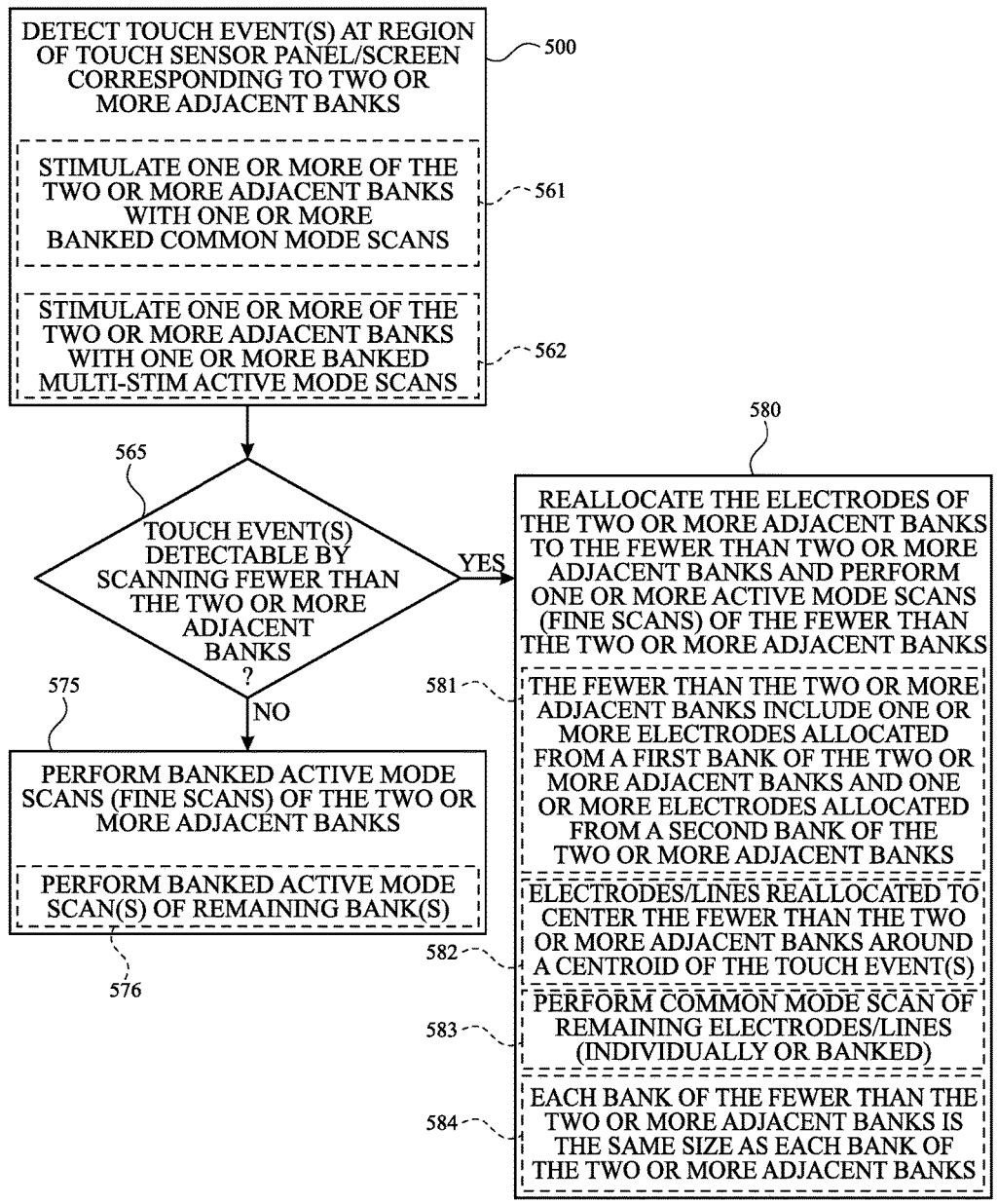
FIG. 5B illustrates another example process for performing touch sensing scanning operations according to examples of the disclosure.

FIG. 5B illustrates another example process for performing touch sensing scanning operations according to examples of the disclosure. The system can be configured to detect, during a first touch sensing period, one or more touch events at a region of a touch sensor panel (or touch screen) corresponding to two or more adjacent banks (i.e., a touch event that overlaps two or more adjacent banks) (560). In some examples, detecting the touch events can include stimulating one or more of the two or more adjacent banks with one or more banked common mode scans (561). In other examples, detecting the touch events can include stimulating one or more of the two or more adjacent banks with one or more banked multi-stim active mode scans (562).

The system can determine whether the touch events can be detected by scanning fewer than the two or more adjacent banks (565). In some examples, the system can detect than the one or more touch events are confined within a threshold number of banks, such that power savings can be achieved by reconfiguring the banks. When the touch events cannot be detected by scanning fewer than the two or more adjacent banks, the system can perform, during the second touch sensing period, an active mode scan (i.e., fine scan) of the two or more adjacent banks (575). In addition, in some examples, the system can perform an active mode scan of any remaining banks of the touch sensor panel (576). When the touch events can reallocate the electrodes/lines of the two or more adjacent banks to the fewer than two or more adjacent banks, and perform one or more active mode scans (e.g., fine scans) of the fewer than the two or more adjacent banks (580). The fewer than two or more adjacent banks can include one or more drive lines/electrodes that were allocated from a first bank of the two or more adjacent banks and one or more electrodes allocated from a second bank of the two or more adjacent banks (581). The electrodes selected to be reallocated to the fewer than two or more adjacent banks can be selected so as to center the fewer than two or more adjacent banks around a centroid of the one or more touch events (582). The system can perform a common mode scan of each remaining line or bank during the second touch sensing period (583). Each bank of the fewer than two or more adjacent banks during the second touch sensing period can have the same bank size as each bank of the two or more adjacent banks during the first touch sensing period (i.e., the same number of drive lines) (584).

A touch sensitive device can be designed to have default operating parameters that can be the boot-up settings for the device and satisfy performance thresholds (e.g., sufficient SNR for touch sensing operations) even in relatively noisy environments. In some cases, the default operating parameters can be set to satisfy performance thresholds for a "worst case" expected noise level. The default parameters can be determined based on laboratory calibration, for example, to satisfy performance criteria (e.g., generating a full scale touch signal output at each touch sensor panel node under given noise conditions). The default parameters can include a default integration time, $T_0$, and a default stimulation signal amplitude, $A_0$. In some examples, the default parameters can be set for a plurality of predetermined frequencies ($f_0$, $f_1$, $f_2$, etc.) at which the touch sensing operations can be implemented. In other words, the default parameters can be frequency dependent rather than being entirely static.

The default parameters can provide an SNR margin when operating in less noisy conditions. When operating in low noise or nominal noise environments, the default parameters can be dynamically adjusted to save power as long as the performance criteria can be satisfied. In some examples the default parameters can be adjusted by scalar multipliers (e.g., numerical multipliers of amplitude or integration time coefficients) or values, which can be stored in a look-up table (LUT), for example. In some examples, the default parameters can be adjusted to consume more power when necessary to boost SNR to meet the performance criteria in particularly noisy environments (e.g., relative to the "worst case" noise). The scalars and/or values stored in the LUT can be generated from tests at calibration time for a variety of frequencies ($f_0$, $f_1$, $f_2$, etc.), stimulation signal amplitudes ($A_0/2$, $A_0/4$, $1.5*A_0$, $2*A_0$, etc.), and integration times ($T_0/2$, $T_0/4$, $1.5*T_0$, $2*T_0$, etc.), which meet the SNR performance requirements (e.g., minimum SNR thresholds).

Figure 6A:
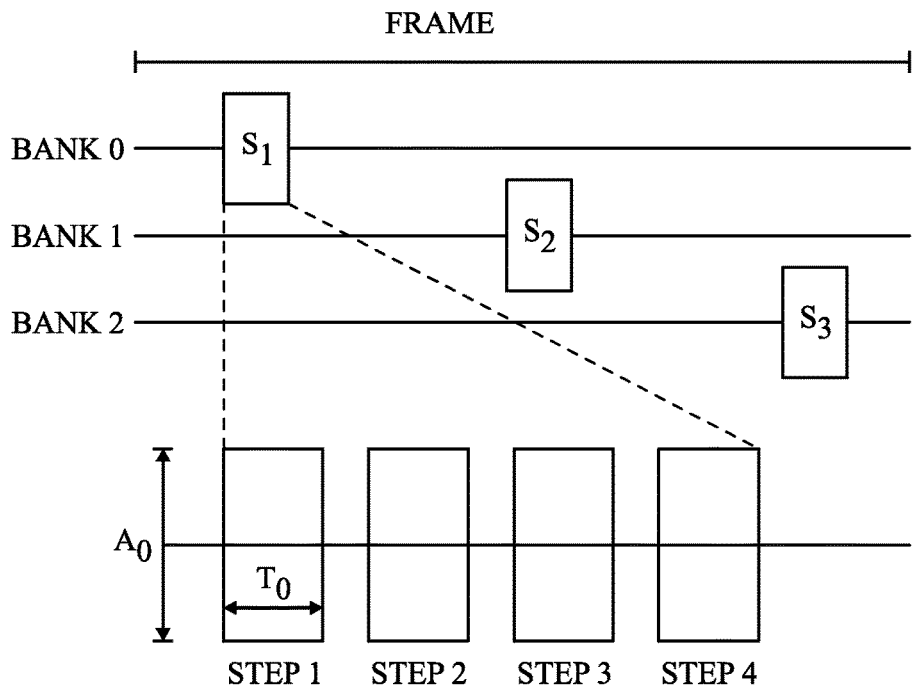
FIGS. 6A-6C illustrate examples of dynamic adjustment of stimulation signal amplitude and integration time according to examples of the disclosure.
Figure 6B:
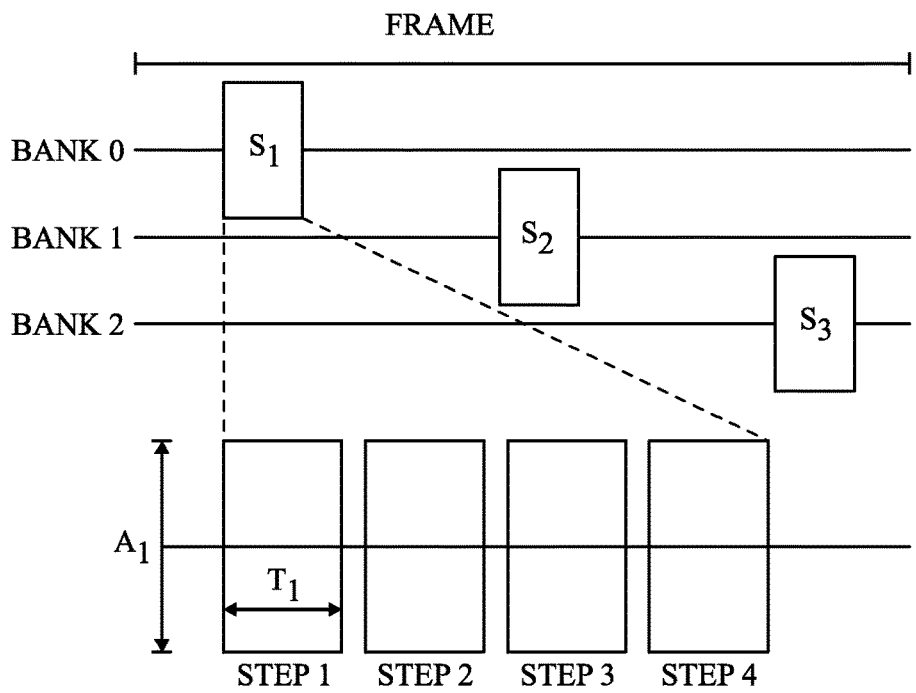
Figure 6C:
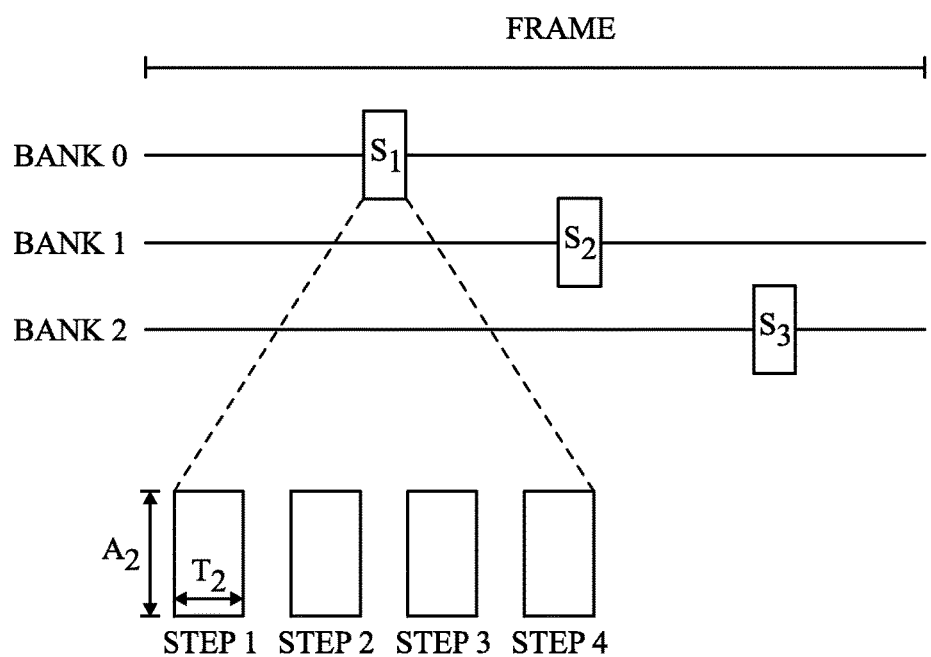

FIGS. 6A-6C illustrate examples of dynamic adjustment of stimulation signal amplitude and integration time according to examples of the disclosure. FIG. 6A illustrates a touch sensor panel with three banks (labeled "BANK 0", "BANK 1" and "BANK 2"), and each bank can include four drive lines (not shown). During a touch sensing frame, each of the banks can be stimulated with either a common mode scan or an active mode scan. Bank 0 can be scanned during the first banked scan (labeled "$S_1$"), Bank 1 can be scanned during the second banked scan (labeled "$S_2$"), and Bank 2 can be scanned during the third banked scan (labeled "$S_3$"). During the active mode scan of Bank 0 at $S_1$, each drive line in the bank can be simultaneously with multi-stim signals with different phases during four scan steps (labeled "Step 1", "Step 2", "Step 3" and "Step 4"). The stimulation signals can have an amplitude $A_0$, which can correspond to the default stimulation signal amplitude. Similarly, the sense channels can have an integration time, $T_0$, which can correspond to the default integration time.

In FIG. 6B, corresponding to a more noisy environment, the touch system can require dynamic adjustment of the stimulation signal amplitude and/or the integration time to improve SNR. As illustrated in FIG. 6B, under the noisier device conditions, each step of $S_1$ can include stimulation signals having an amplitude $A_1$, which can be larger than default stimulation signal amplitude $A_0$ (e.g., $1.5*A_0$), to improve SNR performance. Likewise, the integration time can be $T_1$, which can be larger than the default integration time $T_0$ (e.g., $2*T_0$), to improve SNR performance.

In FIG. 6C, corresponding to a less noisy environment, the touch system can dynamic adjustment of the stimulation signal amplitude and/or the integration time to save power. As illustrated in FIG. 6C, under the less noisy device conditions, each step of $S_1$ can include stimulation signals having an amplitude $A_2$, which can be smaller than default stimulation signal amplitude $A_0$ (e.g., $A_0/2$), to reduce power consumption Likewise, the integration time can be $T_2$, which can be smaller than the default integration time $T_0$ (e.g., $T_0/4$), to reduce power consumption.

Figure 7:
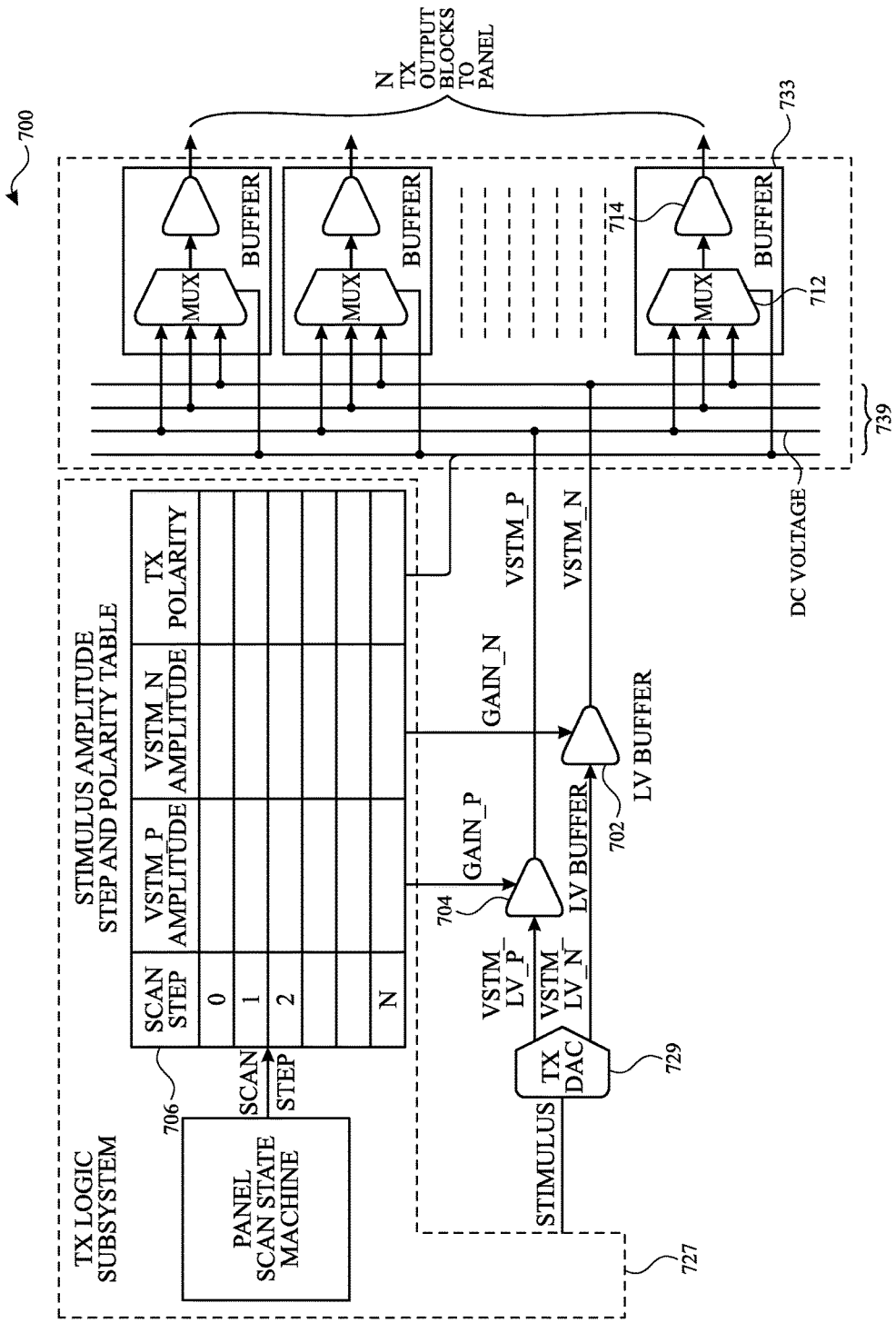
FIG. 7 illustrates an example touch controller transmit (TX) section that can be used to dynamically adjust a stimulation signal amplitude according to examples of the disclosure.

FIG. 7 illustrates an example touch controller transmit (TX) section that can be used to dynamically adjust a stimulation signal amplitude according to examples of the disclosure. TX section 700 can include transmit logic 727, transmit DAC (TX DAC) 729, and N transmit channels 733. A TX numerically controlled oscillator (NCO) (not shown) can provide a clock to transmit logic 727 and TX DAC 729. TX DAC 729 can be a differential DAC and converts the digital signals from transmit logic 727 into stimulation signals Vstim+ and Vstim−. Vstim+ can be a signal having a waveform at the same frequency as TX NCO, and Vstim− can be a signal with the waveform of Vstim+ that can be inverted about a common voltage Vcm (e.g., out of phase with Vstim− by 180 degrees). TX DAC 729 supplies Vstim+ and Vstim− to separate lines of analog bus 739. Bus 739 also includes a line carrying the common voltage, Vcm, and a line that can be grounded (gnd). Each transmit channel 733 includes an analog MUX 712 and output buffer 714. Analog MUX 712 can be connected to each line of bus 739, and can select one of the stimulation signals, Vstim+, Vstim−, Vcm, or gnd to supply to output buffer 714. MUX 712 selects a drive signal based on a stimulation values (e.g., perhaps conceptually arranged as a stimulation matrix) stored in a memory.

During each step of a multi-step scan of the touch sensor panel, each MUX 712 can select one of Vstim+, Vstim−, Vcm, or GND for transmission to a corresponding drive line of the touch sensor panel. The selection of each MUX 712 can be made based on stimulation values stored in a stimulation matrix ("stim matrix"), for example. Each row (or column) of the stim matrix can correspond to one step in the scan, and the data values in a row (or column) specify the selections of stimulation signals for each TX channel 733. Once the MUXs select the signals, the signals can be sent to output buffers 714 to be transmitted to the panel sensor. The TX section 700 can also include DAC buffers 702 and 704. Each DAC buffer can be connected to one of the two outputs of TX DAC 729 at its input and then connected to an array of TX channel 733. DAC buffers 702 and 704 can be used to control the gain applied to the positive phase stimulation signal and the negative phase stimulation signal. The gain can be controlled so as to dynamically adjust the amplitude of the stimulation signals applied to the drive lines to balance power consumption and SNR performance.

The receive (RX) section of the touch controller (not shown) can include sense channels. The sense channels can be configured to integrate sensed signals with a given integration time (i.e., integration step). The integration step can be based on an integration step coefficient from memory, and the integration step can be updated dynamically based on the noise conditions of the device.

The stimulation signal amplitude and integration time can be adjusted for touch sensor panels configured to detect mutual capacitance and/or self-capacitance.

Figure 8:
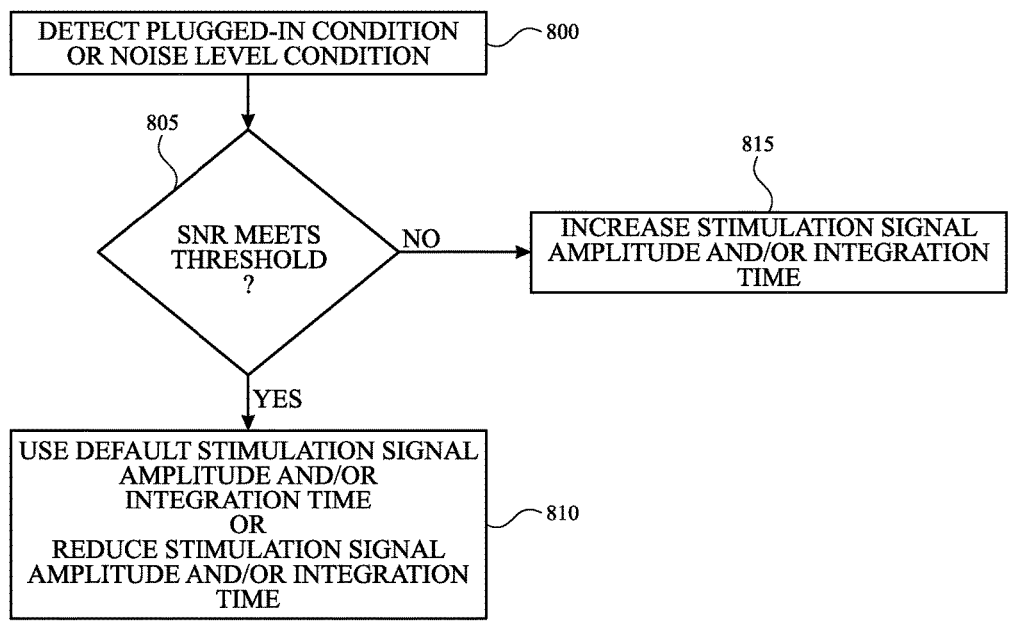
FIG. 8 illustrates an example process for dynamically adjusting the stimulation signal amplitude and integration time according to examples of the disclosure.

FIG. 8 illustrates an example process for dynamically adjusting the stimulation signal amplitude and integration time according to examples of the disclosure. The touch sensing system can detect a plugged in condition or a noise level condition of the device (800). For example, a sensor or other indicator (e.g., flag) in the touch sensitive device can detect that the device is plugged into an alternating current (AC) adapter. In other examples, the touch system can detect a noise level from various aggressors, including, but not limited to, AC adaptors, liquid crystal matrix (LCM) of the liquid crystal display (LCD), fluorescent lights, or radiated noise or radio frequency (RF) interference. The noise levels can be detected by performing a spectral analysis, for example. During the spectral analysis, the system can sense the sense lines when no stimulation signals are applied to the drive lines to detect noise in the system at one or more different frequencies. If the SNR threshold for the system is met for the given noise level condition (or if the device is not plugged in), the system can use either the default stimulation signal amplitude and/or default integration time, or the system can reduce the stimulation signal amplitude and/or the integration times if additional SNR margin is available (810). If the noise level in the system prevents the touch system from meeting the SNR thresholds, the system can increase the stimulation signal amplitude and/or integration time to improve SNR performance (815).

A touch sensitive device can also monitor one or more conditions of the device, and adjust a touch scanning rate based on the monitored condition(s). Adjusting the touch scanning rate can reduce power consumption of the touch sensitive device (e.g., reducing the touch scanning rate can translate into fewer touch sensing scans and thereby power savings) or the reduced touch scanning rate can free up additional scan time that can be reallocated to increase integration time for touch and/or stylus sensing scans. Increased integration times can increase SNR of the touch and/or stylus sensing scans to improve performance to meet performance criteria (e.g., a minimum SNR for touch signals at each node of the touch sensor panel).

FIG. 9A illustrates an example group of touch sensing frames according to examples of the disclosure. FIG. 9A illustrates a plurality of frames that can correspond to periods of time available for touch and/or stylus scanning operations. The duration of the frame can correspond to the touch scanning rate. For example, a 120 Hz touch scanning rate can correspond to performing a touch sensing scan of the touch sensor panel every 8.33 ms. In other words, an 8.33 ms frame can correspond to a 120 Hz touch scanning rate. Similarly, a 240 Hz touch scanning rate can correspond to a 4.17 ms frame, and a 60 Hz touch scanning rate can correspond to a 16.67 ms frame.

Dropping touch sensing scans can be one way to reduce a touch scanning rate. FIG. 9B illustrates an example group of touch sensing frames corresponding to a reduced touch scanning rate according to examples of the disclosure. In the example of FIG. 9B, rather than performing a touch sensing scan every frame, the touch system can perform a touch sensing scan every other frame, for example, to reduce the touch scanning rate in half. In other words, dropping every other touch sensing scan can reduce the touch scanning rate in half, and in the process, can reduce power consumption of the device. Although FIG. 9B illustrates dropping every other touch sensing scan to reduce the touch scanning rate in half, in other examples, the touch scanning rate can be adjusted by adding or dropping any number of touch sensing scans to attain the desired touch scanning rate.

Alternatively, as discussed above, the reduced touch scanning rate can create opportunities to increase integration times of touch and/or stylus scans to improve SNR instead of simply dropping the scan. FIG. 9C illustrates an example reallocation of touch sensing frames to increase SNR according to examples of the disclosure. As illustrated in FIG. 9C, rather than dropping touch sensing scans, some or all of the time allotted to the dropped touch sensing scans in FIG. 9B can be reallocated to increased integration times for touch and/or stylus scans for the corresponding touch sensing scans performed in FIG. 9B. In other words, the touch scanning rate is reduced by half because the touch sensing scans occur once over the course of two frames as in FIG. 9B. Unlike the example of FIG. 9B, however, the second frame period can be used to increase the integration time of the touch and/or stylus sensing scan, and thereby can increase the SNR of the touch signals. Increasing integration time of sensing scans increases the number of samples that can be acquired and averaged, thereby increasing noise immunity for the sense channels. In other words, SNR of the sense channels can be proportional to the square root of the integration time. Reallocating frames to increase integration time can be particularly beneficial when the SNR falls below the SNR thresholds required to meet the performance requirements of the touch system.

Figure 10A:
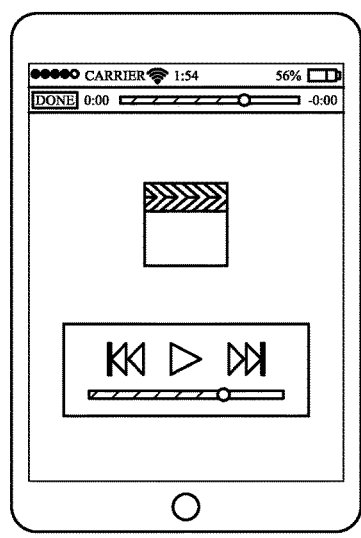
FIG. 10A illustrates an example touch sensitive device executing a video playback application according to examples of the disclosure.

In some examples, the condition(s) of the device can relate to a user interface condition. Some applications may not need the default touch sensing rate for adequate performance, and therefore when the application is in use, the touch sensing system can reduce the touch sensing rate from the default touch sensing rate. For example, FIG. 10A illustrates an example touch sensitive device executing a video playback application according to examples of the disclosure. A video playback application generally expects little touch input from the user (i.e., the user spends most of the time watching the content displayed rather than generating input at the touch-sensitive surface). The touch sensitive device can detect the application in use (e.g., application condition), and the touch system can be configured to execute touch sensing scans at a reduced touch sensing rate. For example, the application condition can be monitored by the host processor, and the touch controller can be configured to adjust the touch scanning rate based on the condition. Other applications that can perform at a touch scanning rate below the default touch scanning rates can be monitored as well. For example, basic internet browsing may not require operating the touch scanning rate at the default scanning rate. The reduced touch scanning rate can be used to either save power or to reallocate the frames to increase integration time and SNR performance.

Figure 10B:
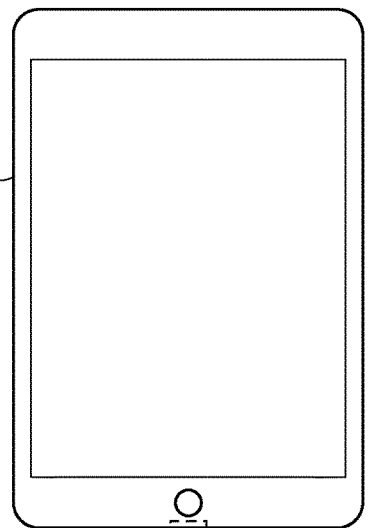
FIG. 10B illustrates an example touch sensitive device coupled to an AC adapter according to examples of the disclosure.

In some examples, the condition(s) of the device can related to a plugged-in condition of the device. An alternating current (AC) adapter coupled to the touch-sensitive device can generate noise which can interfere with touch sensing operations, thereby degrading touch performance. FIG. 10B illustrates an example touch sensitive device coupled to an AC adapter according to examples of the disclosure. In some examples, the noise from the AC adapter can occur at the same frequency as the touch scanning rate. In such an example, adjusting the touch sensing rate can reduce the interference between the AC adapter and the touch sensing operations. For example, an AC adapter can generate noise at 120 Hz, which can interfere with touch scanning operations at a 120 Hz touch scanning rate. By adjusting the touch scanning rate to 60 Hz, for example, by dropping scans, the touch system can reduce interference and improve touch sensing performance. Additionally or alternatively, the time freed up by reducing the touch scanning rate can be used to increase the integration time of the touch and/or stylus sensing scans and can improve SNR performance of the touch sensing system. In other examples, the amplitude of the stimulation signals used to drive the touch sensor panel can be increased to improve SNR.

Figure 10C:
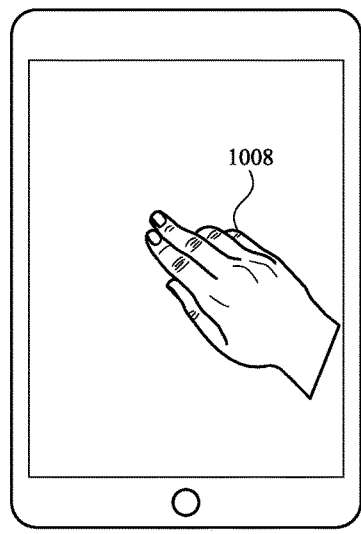
FIG. 10C illustrates an example touch sensitive device sensing multiple fingers according to examples of the disclosure.

In some examples, the condition(s) of the device can relate to the number of fingers touching the surface of the touch sensitive device. FIG. 10C illustrates an example touch sensitive device sensing multiple fingers according to examples of the disclosure. When the touch sensing system detects a plurality of fingers contacting the surface of the touch sensor panel, the touch scanning rate can be reduced. Tracking a single finger or stylus with a default touch scanning rate can improve performance. The default level of performance, however, can be unnecessary when tracking multiple fingers, and therefore the touch scanning rate can be reduced for multiple fingers.

Figure 10D:
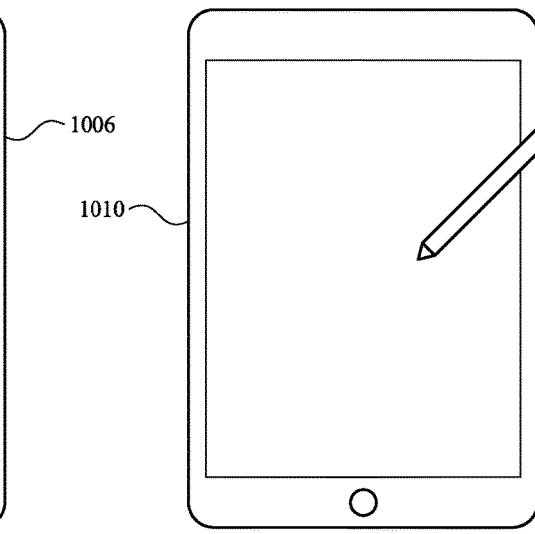
FIG. 10D illustrates an example accessory for use with a touch sensitive device according to examples of the disclosure.

In some examples, the condition(s) of the device can relate to the use of an accessory. For example, an active or passive stylus device can be used for inputting information to the touch sensitive device. FIG. 10D illustrates an example accessory for use with a touch sensitive device according to examples of the disclosure. FIG. 10D illustrates touch sensitive device 1010 and stylus 1012 for providing touch and/or other inputs to the touch sensitive device 1010. When using an accessory, such as a stylus, the touch scanning rate for detecting touches from other objects, such as fingers, can be reduced. As discussed above, reducing the touch scanning rate can be used to reduce power consumption. Alternatively, the reduced touch scanning rate can allow the touch controller to reallocate SNR to other modules or accessories, such as reallocating the SNR to stylus sensing scans or other scans which can benefit from increased SNR.

Techniques for dynamically adjusting the touch scanning rate can be applied for touch sensor panels configured to detect mutual capacitance and/or self-capacitance.

Figure 11:
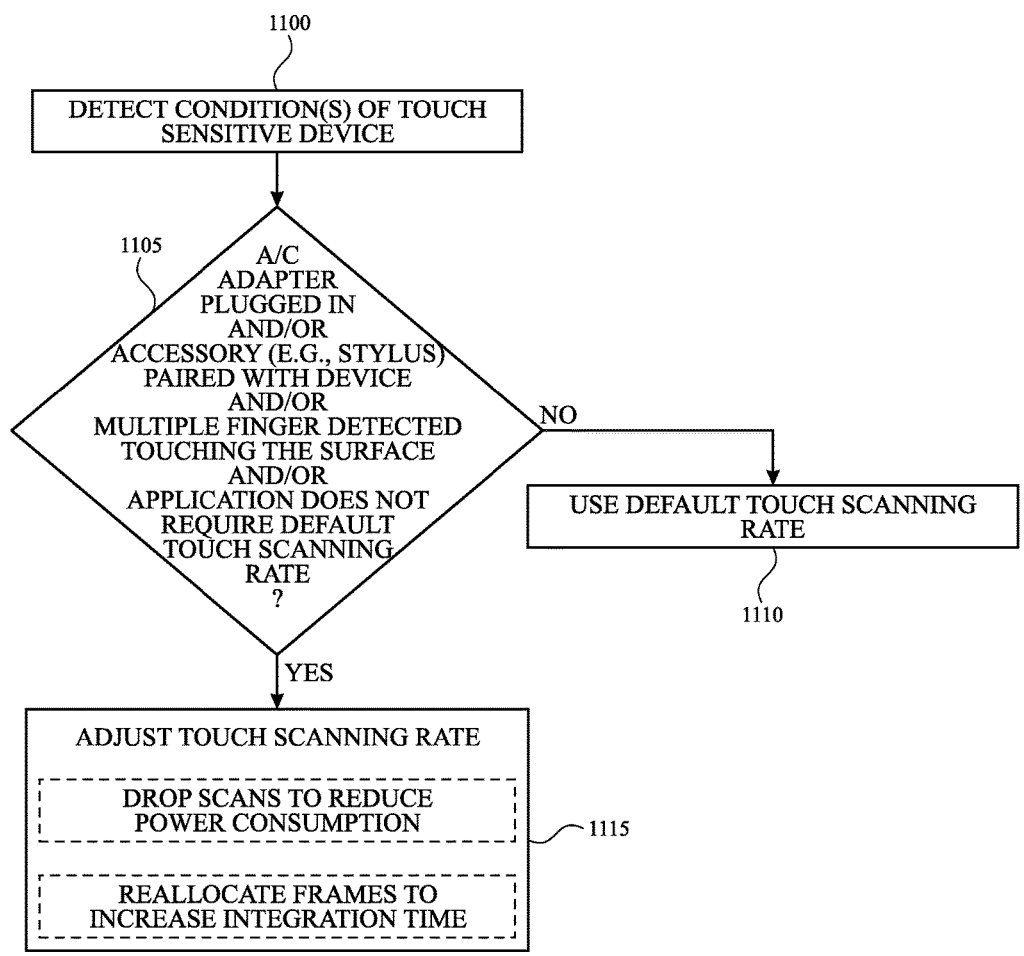
FIG. 11 illustrates an example process for dynamically adjusting a touch scanning rate according to examples of the disclosure.

FIG. 11 illustrates an example process for dynamically adjusting a touch scanning rate according to examples of the disclosure. The system can be configured to detect one or more conditions of the touch sensitive device (1100). Based on the condition of the device, the system can use a default touch scanning rate or adjust the touch scanning rate (1105). For example, if the system determines that an AC adapter is plugged into the device (i.e., plugged-in condition) or that an accessory (e.g., a stylus) is paired with the touch sensitive device, or that multiple fingers are detected at the surface of the device, or that the application in use on the touch sensitive device does not require a default scanning rate, the system can adjust the default scanning rate (1115). Additionally or alternatively, other parameters of the device can be changed to achieve the desired performance criteria (e.g., adjusting the stimulation signal amplitude and/or integration time). If the system determines that no adapter is plugged in, or no accessory is paired with the device, or only a single finger is detected on the surface of the device, or the application in use requires the default scanning rate, then the system can use the default touch scanning rate (1110). Adjusting the touch scanning rate can include dropping touch sensing scans to reduce power consumption and/or reallocating scanning time to increase the SNR performance of the accessory and/or touch sensing scans in order to maintain SNR performance of the system.

Figure 12:
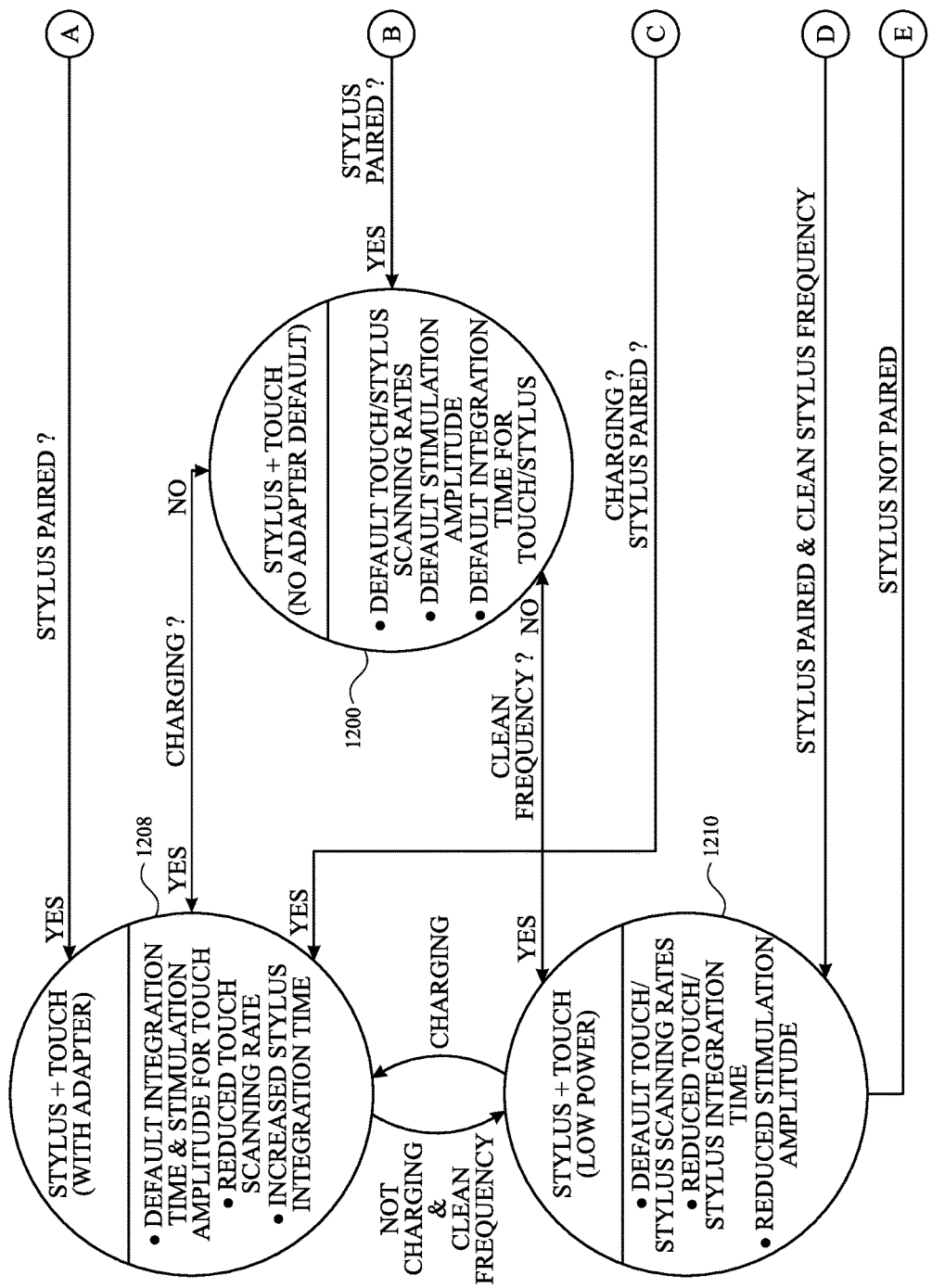
FIG. 12 illustrates an example state diagram for a touch system balancing power consumption with performance according to the examples of the disclosure.
Figure 12:
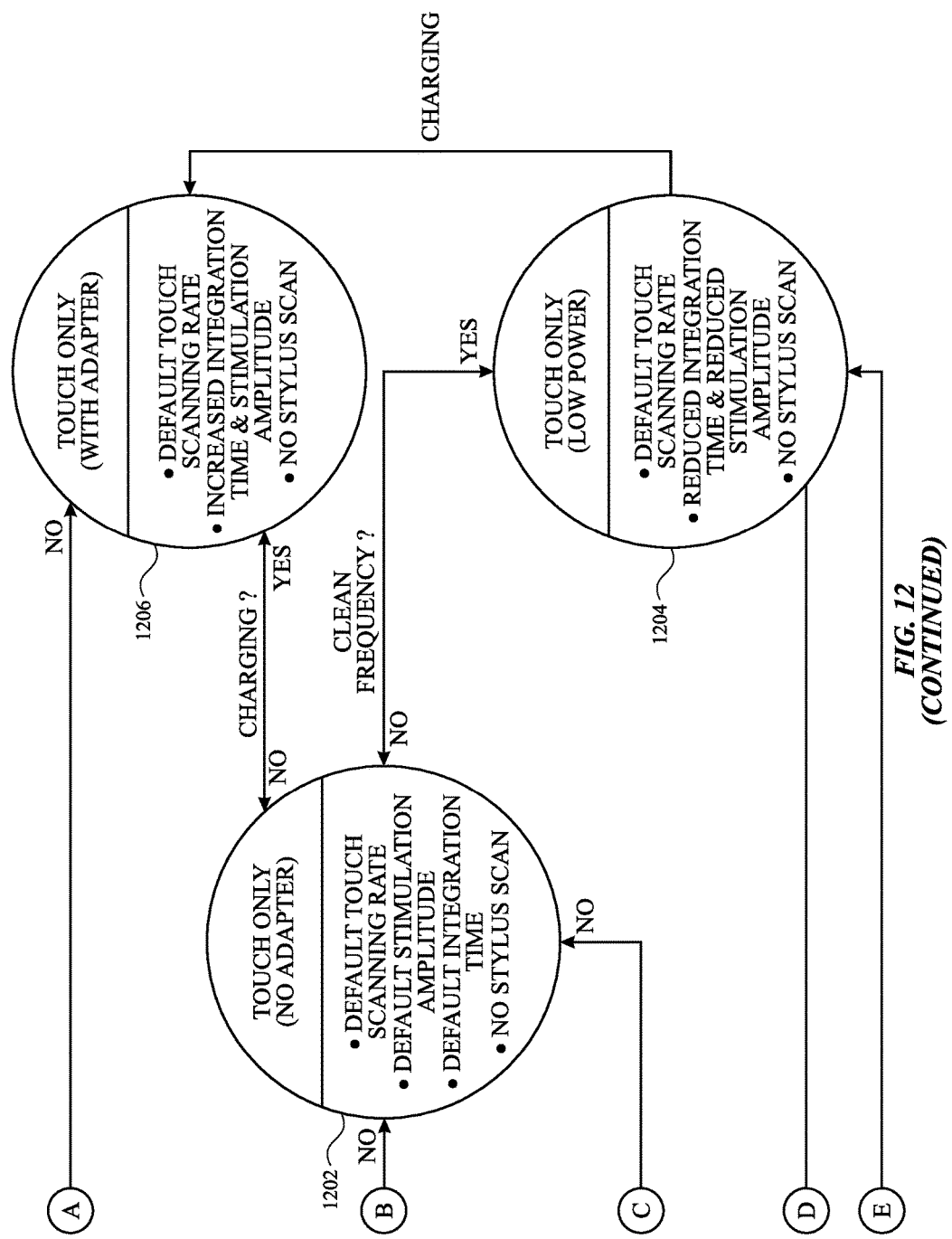

FIG. 12 illustrates an example state diagram for a touch system balancing power consumption with performance according to the examples of the disclosure. The state diagram illustrated in FIG. 12 includes six states, although it should be understood that additional states (and transitions between states) can be possible. The states diagram can include the following states:

(1) State 1200 (labeled "Stylus+Touch (no adapter)"): State 1200 can be a default state for the touch system (e.g., the power-on or reset state) and the remaining states can be used to optimize the balance between power consumption and performance (e.g., measured based on the SNR of the touch signals). In state 1200, the default touch and stylus scanning rates can be used, the default stimulation signal amplitude can be used, and the default integration times for touch and stylus scans can be used.

(2) State 1202 (labeled "Touch Only (no adapter)"): In state 1202, the default touch scanning rate can be used, the default stimulation signal amplitude can be used, and the default integration time for touch scans can be used. No stylus scans are performed in state 1202.

(3) State 1204 (labeled "Touch Only (low power)"): In state 1204, the default touch scanning rate can be used, but the stimulation signal amplitude can be reduced compared with the default stimulation signal amplitude, and the integration time for touch scans can be reduced compared with the default integration time for touch scans. No stylus scans are performed in state 1204.

(4) State 1206 (labeled "Touch Only (with adapter)"): In state 1206, the default touch scanning rate can be used, but the stimulation signal amplitude can be increased compared with the default stimulation signals amplitude, and the integration times for touch scans can be increased compared with the default integration times. No stylus scans are performed in state 1206.

(5) State 1208 (labeled "Stylus+Touch (with adapter)"): In state 1208, the touch scanning rate can be reduced compared with the default touch scanning rate, the default stylus scanning rate can be used, the default stimulation signal amplitude can be used, the default integration time for touch scans can be used, and the stylus scan integration time can be increased compared with the default stylus scan integration time.

(6) State 1210 (labeled "Stylus+Touch (low power)"): In state 1210, the default touch and stylus scanning rates can be used, the stimulation signal amplitude can be reduced compared with the default stimulation signal amplitude, and the integration times for touch and stylus scans can be reduced compared with the default integration times.

The state of the device (and the corresponding scanning parameters for touch and/or stylus scans) can be transitioned based on one or more conditions of the device. The state diagram of FIG. 12 illustrates transitions based on whether an accessory such a stylus is paired with the device (or ceases to be paired), whether the device is plugged in (or not plugged in) to an AC adapter, and whether the scanning frequency is clean (or not clean). Additional conditions can also be used to transition between the one or more states.

For example, the device can transition between state 1200 and state 1202 depending on whether or not a stylus is paired with the device. Additionally or alternatively, the device can transition from state 1202 or state 1204 to state 1206 when the device is plugged in to an AC adapter (charger). Similarly, the device can transition from state 1200 or state 1210 to state 1208 when the device is plugged in to a charger. The device can also transition from state 1206 to state 1202 and from state 1208 to state 1200 when the device is unplugged from the AC adapter.

Additionally or alternatively, the device can transition between state 1202 and state 1204 and between state 1200 and 1210 depending on whether there is a clean frequency available. Using a clean frequency can provide sufficient SNR margin that can be used to reduce integration times and signal amplitude levels to save power. Additionally or alternatively, the device can transition from state 1208 to state 1210 when the device is unplugged and a clean frequency is available. Additionally or alternatively, the device can transition between state 1208 and state 1206 depending on whether a stylus or other accessory is paired with the device. Additionally or alternatively, the device can transition between state 1208 and state 1202 depending on whether a stylus or other accessory is paired with the device and whether the device is plugged in (e.g., the device can transition from state 1202 to 1208 when the stylus is paired and the device is charging). Additionally or alternatively, the device can transition from state 1210 to state 1204 when a stylus or other accessory is no longer paired with the device. Additionally or alternatively, the device can transition from state 1204 to state 1210 when stylus or other accessory is paired and a clean frequency is available for the stylus scans.

Although FIG. 12 illustrates transitioning states (and thereby changing parameters such as integration time and stimulation signal amplitude) based on various conditions, in some cases, the changing of states and/or the changing of parameters can be delayed until all fingers or objects have lifted off the surface of the touch sensitive device. Changing states or parameters when fingers or objects are touching down on the surface of the touch sensitive device can produce inaccurate touch sensing results. In other examples, however, some or all transitions between states and/or parameters can occur substantially instantaneously.

In some cases the scanning rates, integration time(s) and/or stimulation signal levels for each state can be preset parameters (e.g., determined at calibration for a given state). In other examples, upon transitioning between states (or, for example, periodically even when a state is not changed), the system can adjust the scanning rate, integration time(s) and/or stimulation signal levels to different parameter values or levels to achieve the desired balance between performance and power savings under the operating conditions.

Therefore, according to the above, some examples of the disclosure are directed to a method for reducing power consumption of a touch controller. The method can comprise performing a first scan of a first bank, the first bank including a first plurality of electrodes, performing a second scan of a second bank, the second bank including a second plurality of electrodes, and in response to detecting a touch event corresponding to an object touching or proximate to the first bank and the second bank, performing a third scan of a third bank. The third bank can include a third plurality of electrodes including a first subset of the first plurality of electrodes of the first bank and a second subset of the second plurality of electrodes of the second bank. Additionally or alternatively to one or more of the examples disclosed above, in some examples, the detected touch event can correspond to only one object touching or proximate to the touch sensor panel. Additionally or alternatively to one or more of the examples disclosed above, in some examples, the method can further comprise allocating adjacent electrodes from the first plurality of electrodes of the first bank and from the second plurality of electrodes of the second bank such that the third bank can be centered around a centroid of the detected touch event. Additionally or alternatively to one or more of the examples disclosed above, in some examples, the method can further comprise in response to detecting a touch event corresponding to an object touching or proximate to the first bank and the second bank, performing a common mode scan of electrodes of the first plurality of electrodes of the first bank not allocated to the third bank, and performing a common mode scan of electrodes of the second plurality of electrodes of the second bank not allocated to the third bank. Additionally or alternatively to one or more of the examples disclosed above, in some examples, the method can further comprise in response to detecting a plurality of touch events corresponding to a plurality of objects touching or proximate to the first bank and the second bank, performing a fine scan of the first bank and a fine scan of the second bank. Additionally or alternatively to one or more of the examples disclosed above, in some examples, the third bank can be the same size as the first bank, and the third bank can be the same size as the second bank. Additionally or alternatively to one or more of the examples disclosed above, in some examples, the first scan can comprise stimulating the first plurality of electrodes of the first bank with a first common mode stimulation signal to detect a first coarse location of the touch event within the region of the touch sensor panel corresponding to the first bank, and the second scan can comprise stimulating the second plurality of electrodes of the second bank with a second common mode stimulation signal to detect a second coarse location of the touch event within the region of the touch sensor panel corresponding to the second bank. Additionally or alternatively to one or more of the examples disclosed above, in some examples, the first scan can comprise simultaneously stimulating the first plurality of electrodes of the first bank with a first plurality of stimulation signals in a first plurality of stimulation steps to detect a first fine location of the touch event within the region of the touch sensor panel corresponding to the first bank, or the second scan can comprise simultaneously stimulating the second plurality of electrodes of the second bank with a second plurality of stimulation signals in a second plurality of stimulation steps to detect a second fine location of the touch event within the region of the touch sensor panel corresponding to the second bank. Additionally or alternatively to one or more of the examples disclosed above, in some examples, performing the third scan of the third bank can comprises simultaneously stimulating the third plurality of electrodes of the third bank with third stimulation signals having different phases during a plurality of stimulation steps to determine a fine location of the touch event within a region corresponding to the third bank. Some examples of the disclosure are directed to an electronic device with a touch-sensitive display that can be configured to perform the method of any of the examples disclosed above. Some examples of the disclosure are directed to a computer program having instructions which when executed by an electronic device with a touch-sensitive display can cause the electronic device to perform the method of any of the examples disclosed above. Some examples of the disclosure are directed to a computer readable medium having stored thereon a computer program according any of the examples disclosed above.

Some examples of the disclosure are directed to an apparatus. The apparatus can comprise a touch interface and a touch controller coupled to the touch interface. The touch interface can be configured to perform a first scan of a first bank, the first bank including a first plurality of electrodes, perform a second scan of a second bank, the second bank including a second plurality of electrodes, and in response to detecting a touch event corresponding to an object touching or proximate to the first bank and the second bank, perform a third scan of a third bank. The third bank can include a third plurality of electrodes including a first subset of the first plurality of electrodes of the first bank and a second subset of the second plurality of electrodes of the second bank. Additionally or alternatively to one or more of the examples disclosed above, in some examples, the touch interface can comprise a plurality of electrodes allocated equally among a plurality of banks. Additionally or alternatively to one or more of the examples disclosed above, in some examples, the detected touch event can correspond to only one object touching or proximate to the touch interface. Additionally or alternatively to one or more of the examples disclosed above, in some examples, the touch controller can be further configured to allocate adjacent electrodes from the first plurality of electrodes of the first bank and from the second plurality of electrodes of the second bank such that the third bank can be centered around a centroid of the detected touch event. Additionally or alternatively to one or more of the examples disclosed above, in some examples, the touch controller can be further configured to in response to detecting a touch event corresponding to an object touching or proximate to the first bank and the second bank, perform a common mode scan of electrodes of the first plurality of electrodes of the first bank not allocated to the third bank, and perform a common mode scan of electrodes of the second plurality of electrodes of the second bank not allocated to the third bank. Additionally or alternatively to one or more of the examples disclosed above, in some examples, the touch controller can be further configured to in response to detecting a plurality of touch events corresponding to a plurality of objects touching or proximate to the first bank and the second bank, perform a fine scan of the first bank and a fine scan of the second bank. Additionally or alternatively to one or more of the examples disclosed above, in some examples, the third bank can be the same size as the first bank, and the third bank is the same size as the second bank. Additionally or alternatively to one or more of the examples disclosed above, in some examples, performing the third scan of the third bank can comprise simultaneously stimulating the third plurality of electrodes of the third bank with third stimulation signals having different phases during a plurality of stimulation steps to determine a fine location of the touch event within a region corresponding to the third bank.

Some examples of the disclosure are directed to a method for adjusting a touch scanning rate of a touch-sensitive device. The method can comprise detecting one or more conditions of the touch-sensitive device, and in response to detecting the one or more conditions, reducing a touch scanning rate from a default touch scanning rate when a reduced touch scanning rate satisfies one or more performance requirements. Additionally or alternatively to one or more of the examples disclosed above, in some examples, detecting the one or more conditions can comprise determining that an application in use does not require the default touch scanning rate. Additionally or alternatively to one or more of the examples disclosed above, in some examples, detecting the one or more conditions can comprise determining that a plurality of objects are proximate to the touch-sensitive device. Additionally or alternatively to one or more of the examples disclosed above, in some examples, detecting the one or more conditions can comprise detecting one or more noise levels, and an undesirable signal to noise ratio at the default touch scanning rate. Additionally or alternatively to one or more of the examples disclosed above, in some examples, detecting the one or more conditions can comprise detecting a peripheral device communicatively coupled to the touch-sensitive device. Additionally or alternatively to one or more of the examples disclosed above, in some examples, reducing the touch scanning rate can comprise dropping scans to save power. Additionally or alternatively to one or more of the examples disclosed above, in some examples, reducing the touch scanning rate can comprise reallocating scanning time to increase an integration time of touch scans or scans for a peripheral device. Additionally or alternatively to one or more of the examples disclosed above, in some examples, reallocating the scanning time to increase the integration times occurs only after detecting no objects proximate to the touch-sensitive device. Additionally or alternatively to one or more of the examples disclosed above, in some examples, the one or more performance requirements can include meeting a threshold signal to noise ratio for touch signals. Additionally or alternatively to one or more of the examples disclosed above, in some examples, the method can further comprise adjusting a stimulation signal amplitude or integration time based on the one or more detected conditions. Some examples of the disclosure are directed to an electronic device with a touch-sensitive display that can be configured to perform the method of any of the examples disclosed above. Some examples of the disclosure are directed to a computer program having instructions which when executed by an electronic device with a touch-sensitive display can cause the electronic device to perform the method of any of the examples disclosed above. Some examples of the disclosure are directed to a computer readable medium having stored thereon a computer program according any of the examples disclosed above.

Some examples of the disclosure are directed to a method for adjusting a touch scanning rate of a touch-sensitive device. The method can comprise detecting one or more conditions of the touch-sensitive device, determining whether one or more performance requirements are satisfied under the one or more conditions, and in response to determining the one or more performance requirements are satisfied, reducing a touch scanning rate from a default touch scanning rate. Additionally or alternatively to one or more of the examples disclosed above, in some examples, the method can further comprise in response to determining the one or more performance requirements are not satisfied, increasing the touch scanning rate. Additionally or alternatively to one or more of the examples disclosed above, in some examples, the method can further comprise in response to determining the one or more performance requirements are not satisfied, increasing a stimulation signal amplitude or an integration time, and in response to determining the one or more performance requirements are satisfied, reducing the stimulation signal amplitude or the integration time. Additionally or alternatively to one or more of the examples disclosed above, in some examples, detecting the one or more conditions can comprise detecting an application in use, and determining whether the one or more performance requirements are satisfied under the one or more conditions can comprise determining that the application in use does not require the default touch scanning rate. Additionally or alternatively to one or more of the examples disclosed above, in some examples, detecting the one or more conditions can comprises determining that a plurality of objects are proximate to the touch-sensitive device, and determining whether the or more performance requirements are satisfied under the one or more conditions can comprise determining that a default touch scanning rate is not required for the plurality of objects. Additionally or alternatively to one or more of the examples disclosed above, in some examples, detecting the one or more conditions can comprise detecting one or more noise levels, and determining whether the one or more performance requirements are satisfied under the one or more conditions can comprise determine a signal to noise ratio at the default touch scanning rate. Additionally or alternatively to one or more of the examples disclosed above, in some examples, detecting the one or more conditions can comprise detecting a peripheral device communicatively coupled to the touch-sensitive device, and determining whether the one or more performance requirements are satisfied under the one or more conditions can comprise determine a signal to noise ratio at the default touch scanning rate for touch scans and for scans for the peripheral device. Additionally or alternatively to one or more of the examples disclosed above, in some examples, reducing the touch scanning rate can comprise dropping scans to save power. Additionally or alternatively to one or more of the examples disclosed above, in some examples, reducing the touch scanning rate can comprise reallocating scanning time to increase an integration time of a touch scan or a scan for a peripheral device. Additionally or alternatively to one or more of the examples disclosed above, in some examples, reallocating scanning time to increase an integration time can occur only after detecting no objects proximate to the touch-sensitive device. Additionally or alternatively to one or more of the examples disclosed above, in some examples, the one or more performance requirements can include meeting a threshold signal to noise ratio for touch signals. Some examples of the disclosure are directed to an electronic device with a touch-sensitive display that can be configured to perform the method of any of the examples disclosed above. Some examples of the disclosure are directed to a computer program having instructions which when executed by an electronic device with a touch-sensitive display can cause the electronic device to perform the method of any of the examples disclosed above. Some examples of the disclosure are directed to a computer readable medium having stored thereon a computer program according any of the examples disclosed above.

Some examples of the disclosure are directed to a method for reducing power consumption of a touch controller. The method can comprise performing banked scans of two or more first banks, each of the two or more first banks including a plurality of electrodes, and in response to detecting one or more touch events corresponding to one or more objects touching or proximate to the two or more first banks, performing one or more banked scans of one or more second banks, the one or more second banks including at least a subset of the plurality of electrodes of two of the two or more first banks. Additionally or alternatively to one or more of the examples disclosed above, in some examples, the method can further comprise allocating adjacent electrodes from the two or more first banks such that the one or more second banks are centered around a centroid of the detected one or more touch events. Additionally or alternatively to one or more of the examples disclosed above, in some examples, the method can further comprise in response to detecting the one or more touch events, performing one or more common mode scans of electrodes of the plurality of electrodes of the two or more first banks not allocated to the one or more second banks. Additionally or alternatively to one or more of the examples disclosed above, in some examples, each of the one or more second banks can be the same size as each of the two or more first banks. Additionally or alternatively to one or more of the examples disclosed above, in some examples, the banked scans can comprise stimulating one or more of the two or more first banks with a common mode stimulation signal to detect a coarse location of the touch event within the region of the touch sensor panel corresponding to one or more of the two or more first banks. Additionally or alternatively to one or more of the examples disclosed above, in some examples, the method can further comprise performing a self-capacitance scan of a touch sensor panel to detect a coarse location of the one or more touch events touching or proximate to the touch sensor panel. Additionally or alternatively to one or more of the examples disclosed above, in some examples, the banked scan can comprise simultaneously stimulating the plurality of electrodes of one or more of the two or more first banks with a first plurality of stimulation signals in a first plurality of stimulation steps to detect a first fine location of the touch event within the region of the touch sensor panel corresponding to the one or more of the two or more first banks. Additionally or alternatively to one or more of the examples disclosed above, in some examples, performing the one or more banked scan of the one or more second banks can comprise simultaneously stimulating a plurality of electrodes of at the one or more second banks with a second plurality of stimulation signals having different phases during a second plurality of stimulation steps to determine a second fine location of the touch event within a region corresponding to the one or more second banks. Some examples of the disclosure are directed to an electronic device with a touch-sensitive display that can be configured to perform the method of any of the examples disclosed above. Some examples of the disclosure are directed to a computer program having instructions which when executed by an electronic device with a touch-sensitive display can cause the electronic device to perform the method of any of the examples disclosed above. Some examples of the disclosure are directed to a computer readable medium having stored thereon a computer program according any of the examples disclosed above. Some examples of the disclosure are directed to an apparatus comprising a touch interface and a touch controller. The touch controller can be configured to perform the method according any of the examples disclosed above.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. A method for reducing power consumption of a touch controller comprising:
   performing banked scans of a plurality of first banks, each of the plurality of first banks allocated a respective plurality of electrodes;
   detecting one or more touch events from the banked scans of the plurality of first banks; and
   in response to detecting the one or more touch events:
      in accordance with a determination that one or more first criteria are satisfied when the one or more touch events correspond to one or more objects touching or proximate over two, and not more than two, of the plurality of first banks, wherein the two of the plurality of first banks are adjacent banks:
         reallocating a subset of the respective plurality of electrodes of one of the two of the plurality of first banks and a subset of the respective plurality of electrodes of a second of the two of the plurality of first banks to a second bank;
         reallocating a remaining subset of the respective plurality of electrodes of the one of the two of the plurality of first banks and a remaining subset of the respective plurality of electrodes of the second of the two of the plurality of first banks to one or more third banks;
         performing a banked active mode scan of electrodes reallocated to the second bank; and
         performing, for each respective third bank of the one or more third banks, a banked common mode scan of all electrodes reallocated to the respective third bank; and
      in accordance with a determination that the one or more first criteria are not satisfied when the one or more touch events correspond to the one or more objects touching or proximate over three or more of the plurality of first banks:
         performing, for each respective first bank of the plurality of first banks, a banked active mode scan of the respective plurality of electrodes allocated to the plurality of first banks.

2. The method of claim 1, further comprising:
   in accordance with the determination that the one or more first criteria are satisfied, allocating adjacent electrodes from the two of the plurality of first banks such that the second bank is centered around a centroid of the detected one or more touch events.

3. The method of claim 1, wherein the second bank is the same size as each of the two of the plurality of first banks.

4. The method of claim 1, wherein the banked scans of the plurality of first banks comprises, for each respective first bank of the plurality of first banks, stimulating the respective plurality of electrodes of the respective first bank with a common mode stimulation signal to detect a coarse location of the touch event within a region of a touch sensor panel corresponding to the respective first bank.

5. The method of claim 1, further comprising:
   performing a self-capacitance scan of a touch sensor panel to detect a coarse location of the one or more touch events touching or proximate to the touch sensor panel.

6. The method of claim 1, wherein the banked scans of the plurality of first banks comprises, for each respective first bank of the plurality of first banks, simultaneously stimulating the respective plurality of electrodes with a first plurality of stimulation signals in a first plurality of stimulation steps to detect a first fine location of the touch event within a region of a touch sensor panel corresponding to the respective first bank.

7. The method of claim 6, wherein performing the banked active mode scan of the electrodes reallocated to the second bank comprises simultaneously stimulating the reallocated electrodes of the second bank with a second plurality of stimulation signals having different phases during a second plurality of stimulation steps to determine a second fine location of the touch event within a region of a touch sensor panel corresponding to the second bank.

8. An electronic device comprising:
   a touch-sensitive display; and
   a touch controller coupled to the touch-sensitive display and configured to:
      perform banked scans of a plurality of first banks, each of the plurality of first banks allocated a respective plurality of electrodes;
      detect one or more touch events from the banked scans of the plurality of first banks; and
      in response to detecting the one or more touch events:
         in accordance with a determination that one or more first criteria are satisfied when the one or more touch events correspond to one or more objects touching or proximate over two, and not more than two, of the plurality of first banks, wherein the two of the plurality of first banks are adjacent banks:
            reallocate a subset of the respective plurality of electrodes of one of the two of the plurality of first banks and a subset of the respective plurality of electrodes of a second of the two of the plurality of first banks to a second bank;

reallocate a remaining subset of the respective plurality of electrodes of the one of the two of the plurality of first banks and a remaining subset of the respective plurality of electrodes of the second of the two of the plurality of first banks to one or more third banks;

perform a banked active mode scan of electrodes reallocated to the second bank; and perform, for each respective third bank of the one or more third banks, a banked common mode scan of all electrodes reallocated to the respective third bank; and in accordance with a determination that the one or more first criteria are not satisfied when the one or more touch events correspond to the one or more objects touching or proximate over three or more of the plurality of first banks:

perform, for each respective first bank of the plurality of first banks, a banked active mode scan of the respective plurality of electrodes allocated to the plurality of first banks.

9. The electronic device of claim 8, wherein the respective plurality of electrodes are allocated equally among the plurality of first banks.

10. The electronic device of claim 8, the touch controller further configured to: in accordance with the determination that the one or more first criteria are satisfied, allocate adjacent electrodes from the two of the plurality of first banks such that the second bank is centered around a centroid of the detected one or more touch events.

11. The electronic device of claim 8, wherein the second bank is the same size as each of the two of the plurality of first banks.

12. The electronic device of claim 8, wherein the banked scans of the plurality of first banks comprises, for each respective first bank of the plurality of first banks, stimulating the respective plurality of electrodes of the respective first bank with a common mode stimulation signal to detect a coarse location of the touch event within a region of the touch-sensitive display corresponding to the respective first bank.

13. The electronic device of claim 8, the touch controller further configured to:

perform a self-capacitance scan of the touch-sensitive display to detect a coarse location of the one or more touch events touching or proximate to the touch-sensitive display.

14. The electronic device of claim 8, wherein the banked scans of the plurality of first banks comprises, for each respective first bank of the plurality of first banks, simultaneously stimulating the respective plurality of electrodes with a first plurality of stimulation signals in a first plurality of stimulation steps to detect a first fine location of the touch event within a region of the touch-sensitive display corresponding to the respective first bank.

15. The electronic device of claim 14, wherein performing the banked active mode scan of the electrodes reallocated to the second bank comprises simultaneously stimulating the reallocated electrodes of the second bank with a second plurality of stimulation signals having different phases during a second plurality of stimulation steps to determine a second fine location of the touch event within a region of a touch-sensitive display corresponding to the second bank.

16. A non-transitory computer readable storage medium containing instructions that, when executed by a processor, can perform a method for reducing power consumption of a touch controller, the method comprising:

performing banked scans of a plurality of first banks, each of the plurality of first banks allocated a respective plurality of electrodes;

detecting one or more touch events from the banked scans of the plurality of first banks; and in response to detecting the one or more touch events:

in accordance with a determination that one or more first criteria are satisfied when the one or more touch events correspond to one or more objects touching or proximate over two, and not more than two, of the plurality of first banks, wherein the two of the plurality of first banks are adjacent banks:

reallocating a subset of the respective plurality of electrodes of one of the two of the plurality of first banks and a subset of the respective plurality of electrodes of a second of the two of the plurality of first banks to a second bank;

reallocating a remaining subset of the respective plurality of electrodes of the one of the two of the plurality of first banks and a remaining subset of the respective plurality of electrodes of the second of the two of the plurality of first banks to one or more third banks;

performing a banked active mode scan of electrodes reallocated to the second bank; and performing, for each respective third bank of the one or more third banks, a banked common mode scan of all electrodes reallocated to the respective third bank; and in accordance with a determination that the one or more first criteria are not satisfied when the one or more touch events correspond to the one or more objects touching or proximate over three or more of the plurality of first banks:

performing, for each respective first bank of the plurality of first banks, a banked active mode scan of the respective plurality of electrodes allocated to the plurality of first banks.

17. The non-transitory computer readable storage medium of claim 16, further comprising:

in accordance with the determination that the one or more first criteria are satisfied, allocating adjacent electrodes from the two of the plurality of first banks such that the second bank is centered around a centroid of the detected one or more touch events.

18. The non-transitory computer readable storage medium of claim 16, wherein the second bank is the same size as each of the two of the plurality of first banks.

19. The non-transitory computer readable storage medium of claim 16, wherein the banked scans of the plurality of first banks comprises, for each respective first bank of the plurality of first banks, stimulating the respective plurality of electrodes of the respective first bank with a common mode stimulation signal to detect a coarse location of the touch event within a region of a touch sensor panel corresponding to the respective first bank.

20. The non-transitory computer readable storage medium of claim 16, further comprising:

performing a self-capacitance scan of a touch sensor panel to detect a coarse location of the one or more touch events touching or proximate to the touch sensor panel.

21. The non-transitory computer readable storage medium of claim 16, wherein the banked scans of the plurality of first banks comprises, for each respective first bank of the plurality of first banks, simultaneously stimulating the respective plurality of electrodes with a first plurality of stimulation signals in a first plurality of stimulation steps to detect a first fine location of the touch event within a region of a touch sensor panel corresponding to the respective first bank.

22. The non-transitory computer readable storage medium of claim 21, wherein performing the banked active mode scan of the electrodes reallocated to the second bank comprises simultaneously stimulating the reallocated electrodes of the second bank with a second plurality of stimulation signals having different phases during a second plurality of stimulation steps to determine a second fine location of the touch event within a region of a touch sensor panel corresponding to the second bank.

* * * * *